Figure 5:
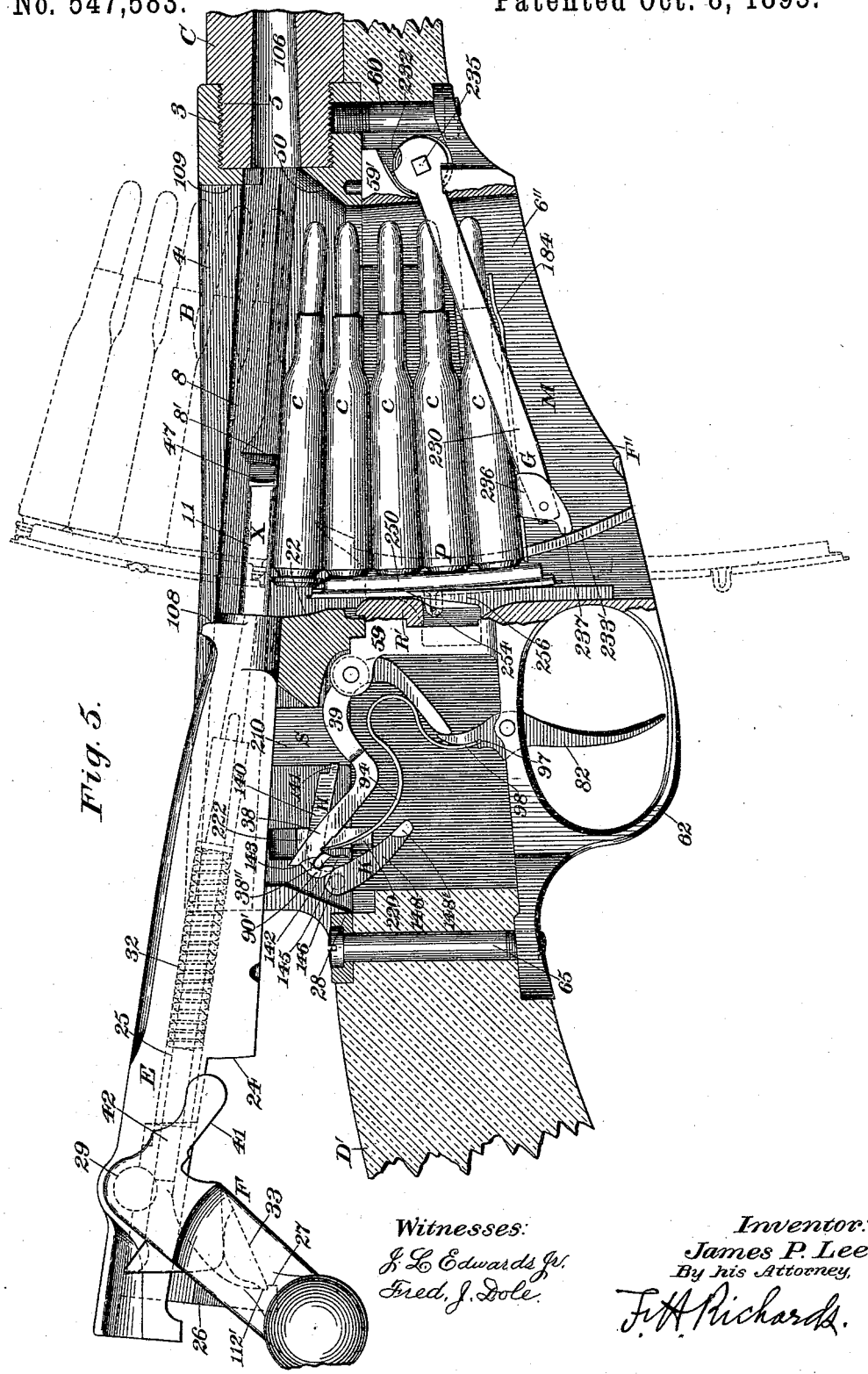

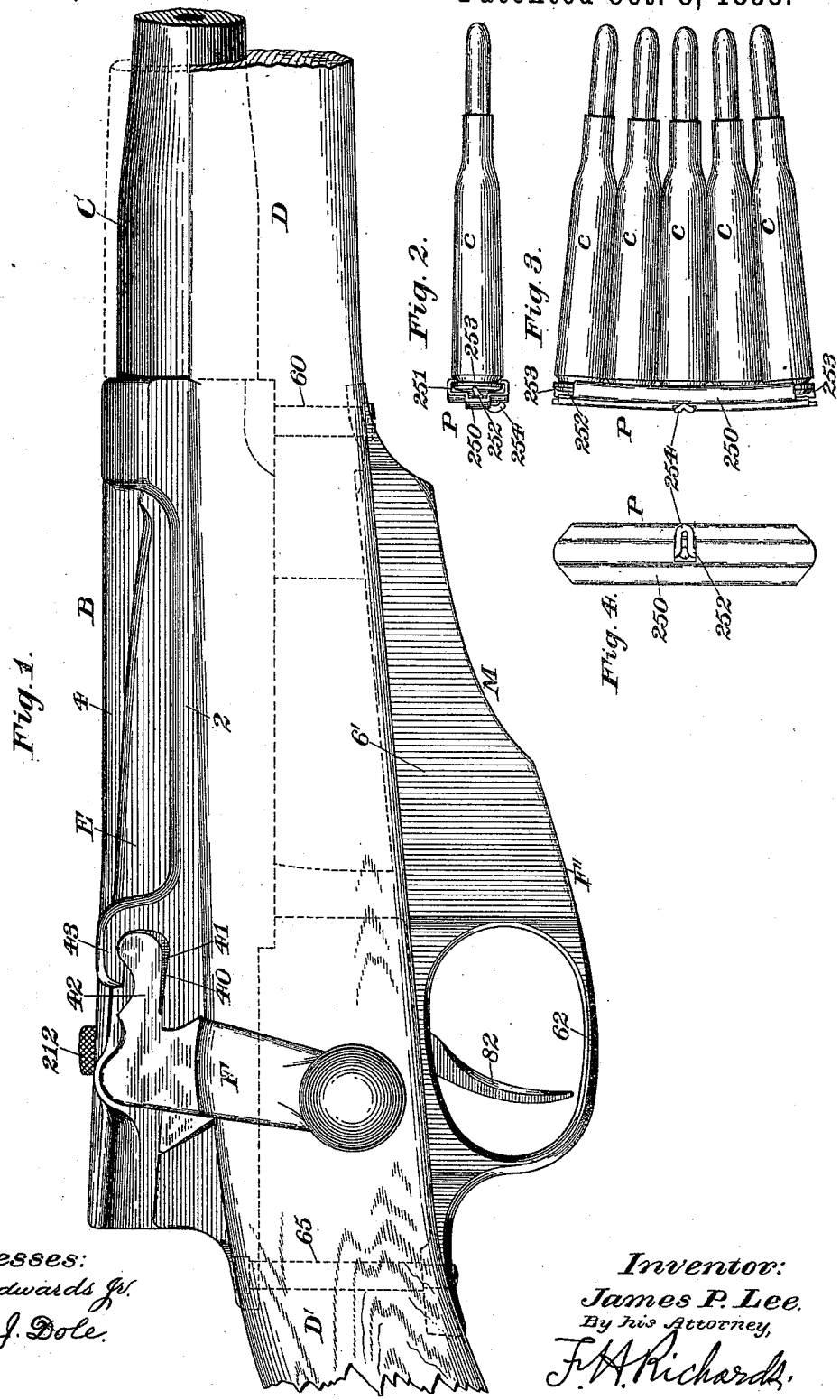

(No Model.) 16 Sheets—Sheet 2.
J. P. LEE.
MAGAZINE BOLT GUN.

No. 547,583. Patented Oct. 8, 1895.

Witnesses:
J. L. Edwards Jr.
Fred. J. Dole.

Inventor:
James P. Lee.
By his Attorney,
F. H. Richards.

(No Model.) 16 Sheets—Sheet 3.

J. P. LEE.
MAGAZINE BOLT GUN.

No. 547,583. Patented Oct. 8, 1895.

Witnesses:
J. L. Edwards Jr.
Fred. J. Dole.

Inventor:
James P. Lee.
By his Attorney,
F. A. Richards.

(No Model.) 16 Sheets—Sheet 4.
J. P. LEE.
MAGAZINE BOLT GUN.
No. 547,583. Patented Oct. 8, 1895.
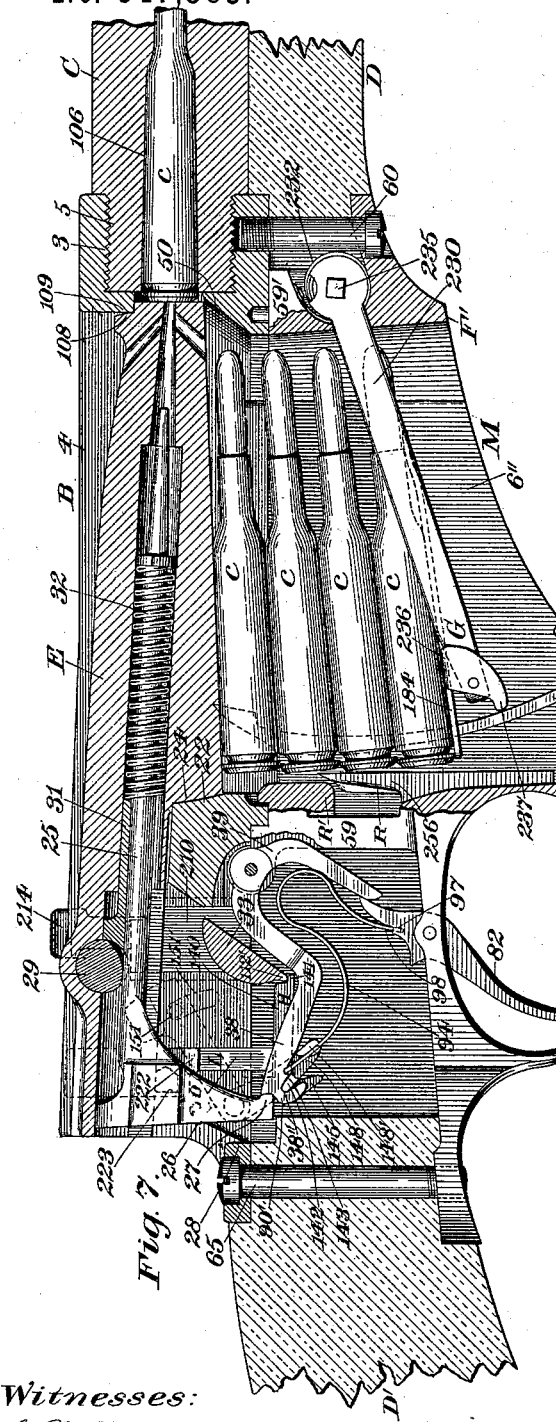
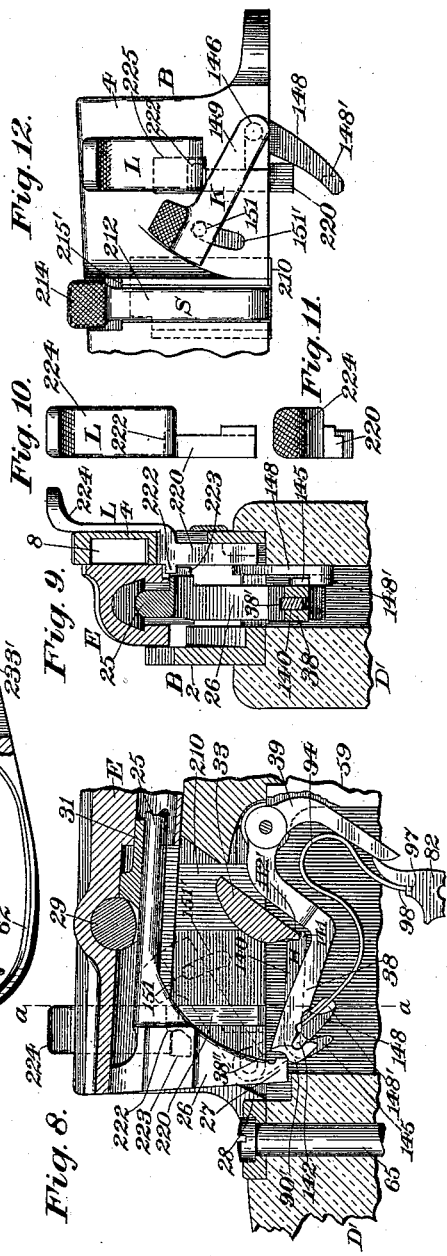
Witnesses:
J. L. Edwards Jr.
Fred. J. Dole.
Inventor:
James P. Lee.
By his Attorney,
F. H. Richards.

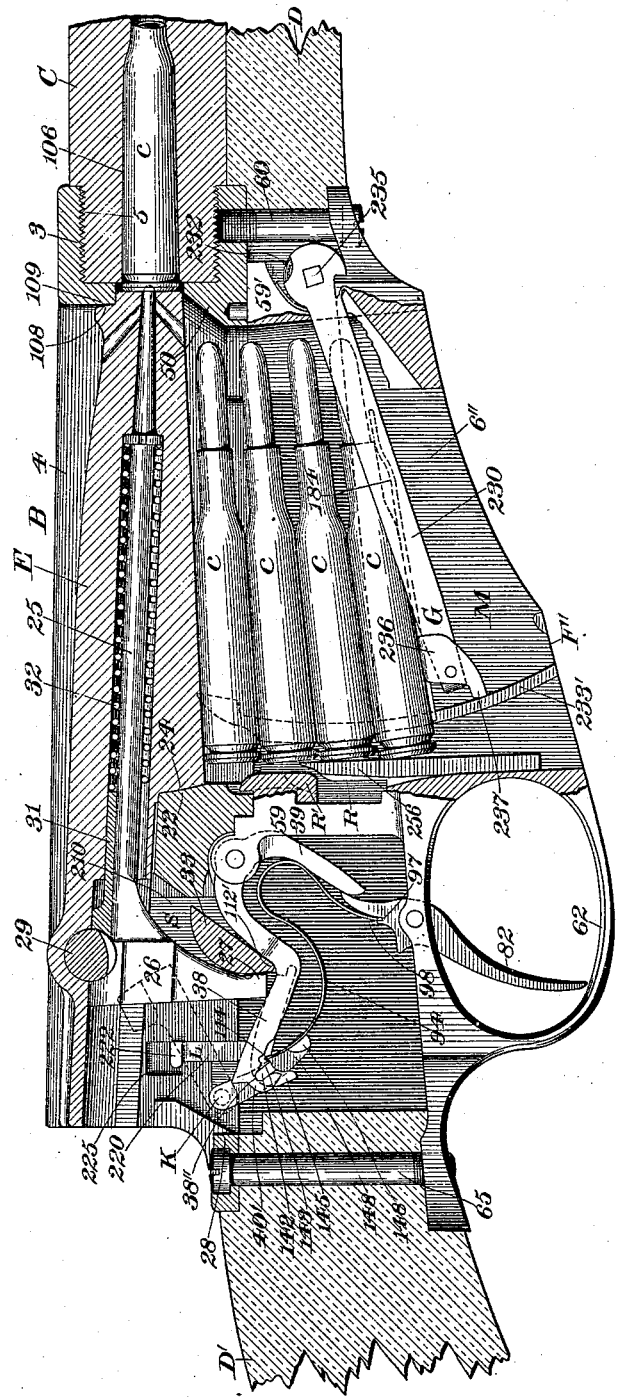

(No Model.) 16 Sheets—Sheet 6.

J. P. LEE.
MAGAZINE BOLT GUN.

No. 547,583. Patented Oct. 8, 1895.

Witnesses:
J. L. Edwards Jr.
Fred. J. Dole.

Inventor:
James P. Lee.
By his Attorney,
F. A. Richards.

ANDREW B.GRAHAM. PHOTO-LITHO. WASHINGTON,D.C (No Model.) 16 Sheets—Sheet 7.
J. P. LEE.
MAGAZINE BOLT GUN.
No. 547,583. Patented Oct. 8, 1895.
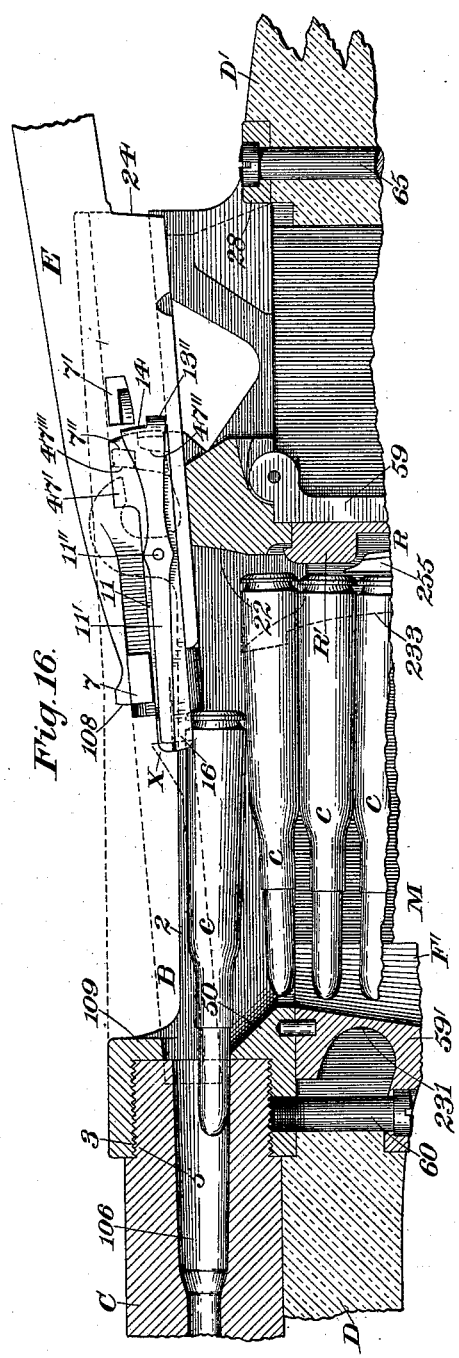
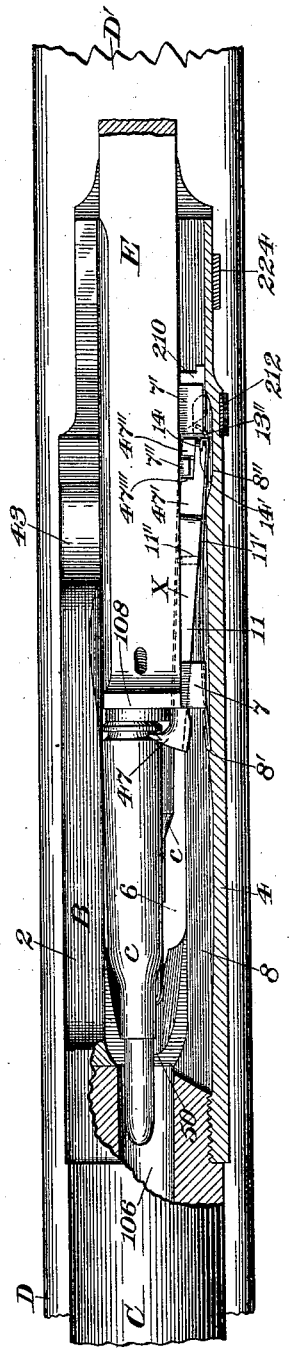
Witnesses:
J. L. Edwards Jr.
Fred. J. Dole.
Inventor:
James P. Lee.
By his Attorney,
F. H. Richards.

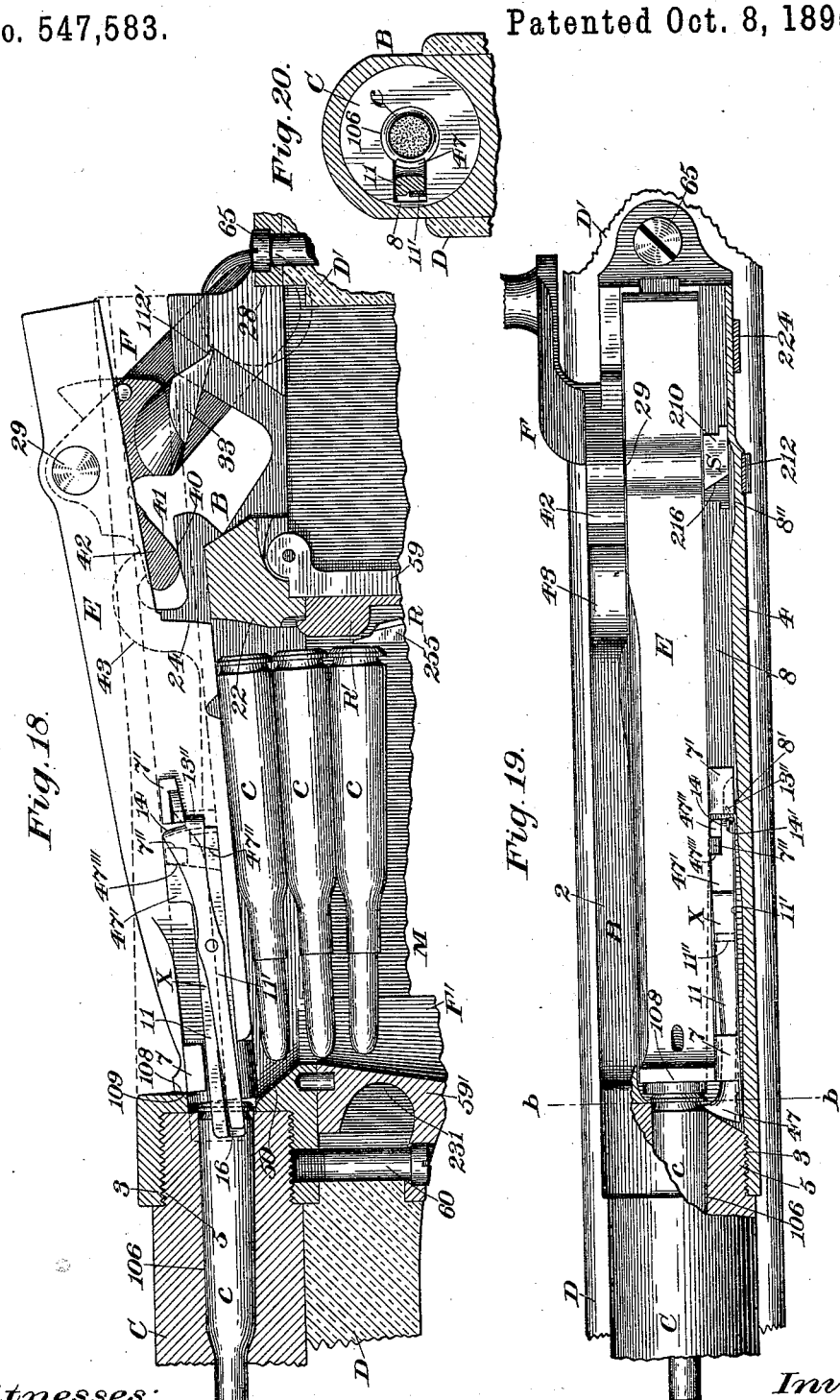

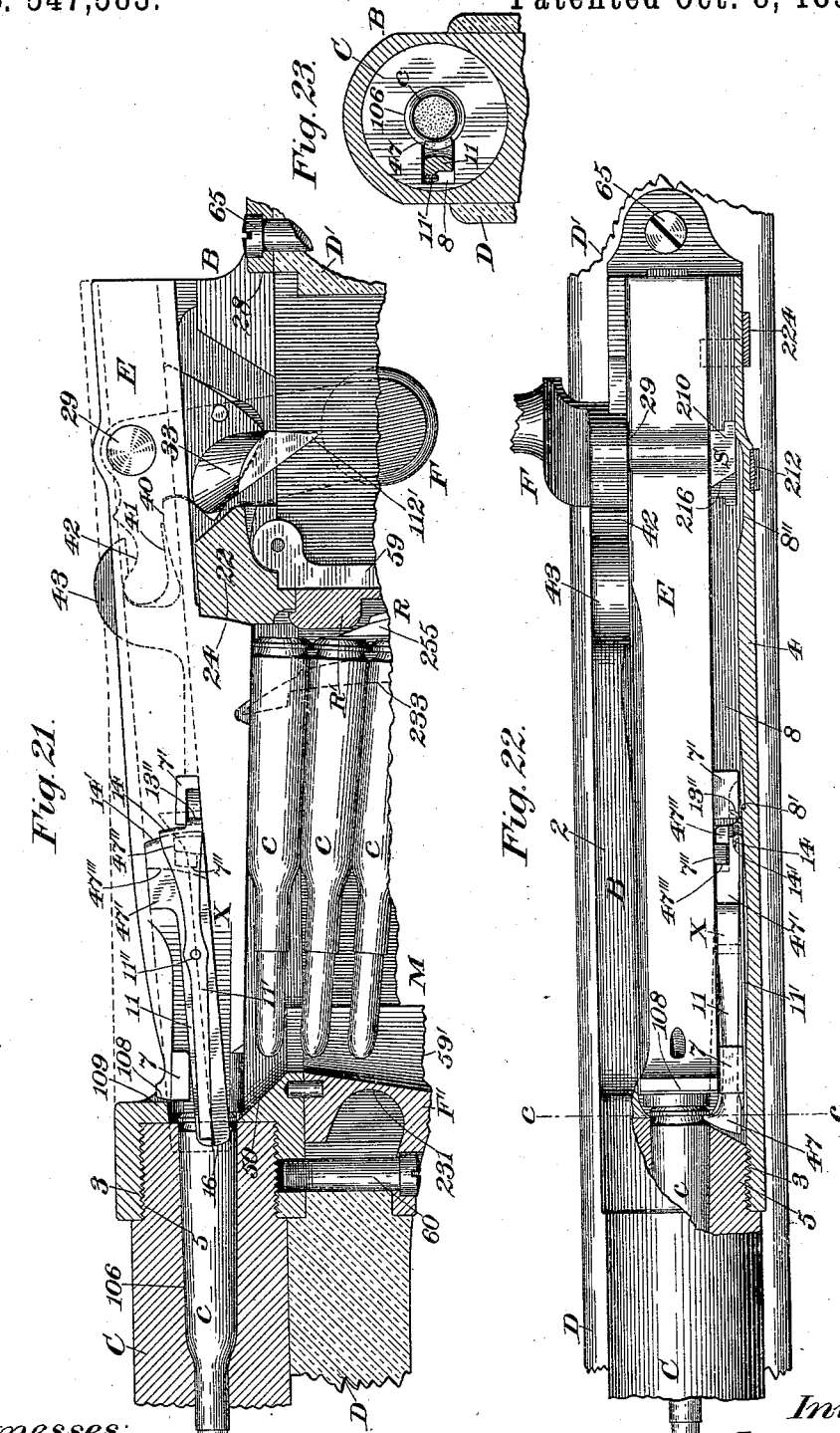

(No Model.)  16 Sheets—Sheet 10.

J. P. LEE.
MAGAZINE BOLT GUN.

No. 547,583.  Patented Oct. 8, 1895.

Witnesses:
J. L. Edwards Jr.
Fred. J. Dole.

Inventor:
James P. Lee.
By his Attorney,
F. H. Richards.

(No Model.) 16 Sheets—Sheet 11.
J. P. LEE.
MAGAZINE BOLT GUN.
No. 547,583. Patented Oct. 8, 1895.
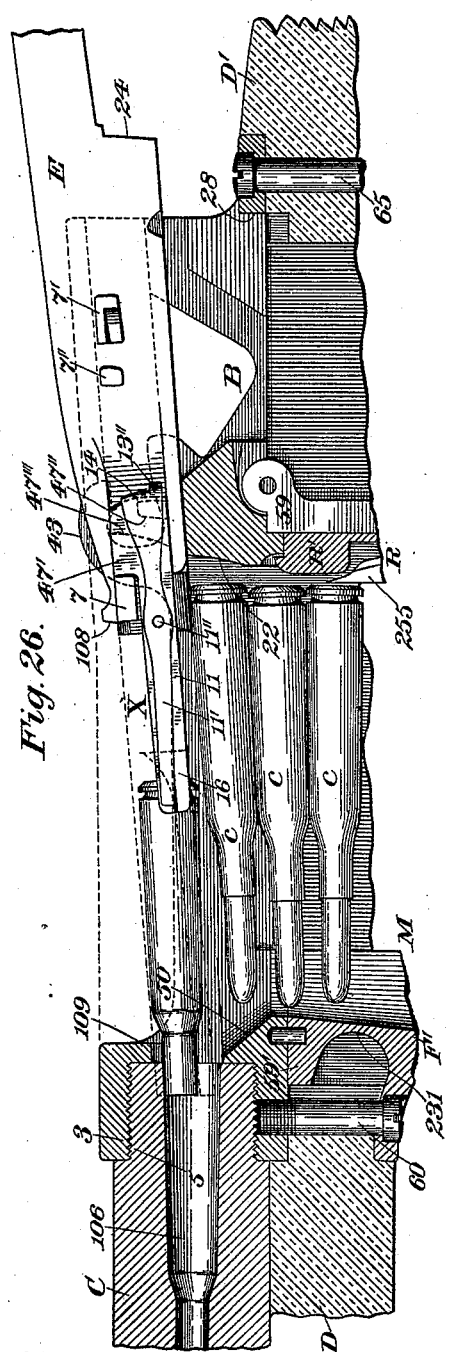
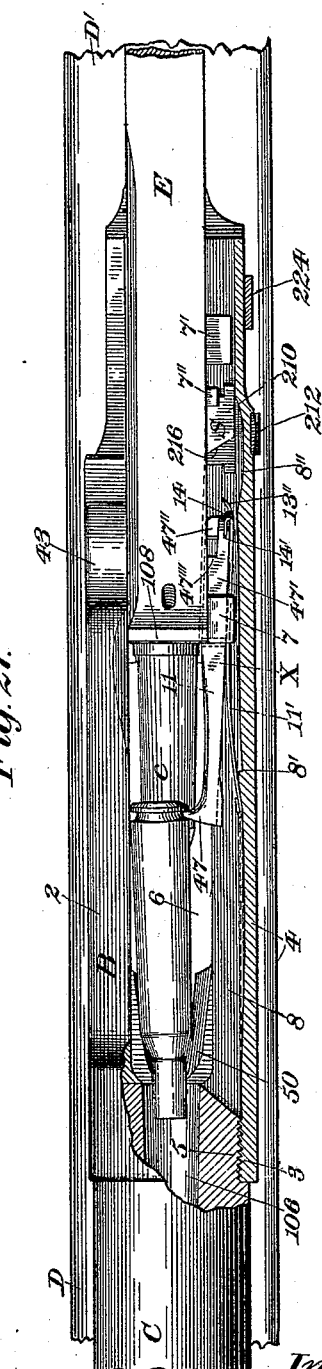
Witnesses:
J. L. Edwards Jr.
Fred. J. Dole.
Inventor:
James P. Lee.
By his Attorney,
F. H. Richards.

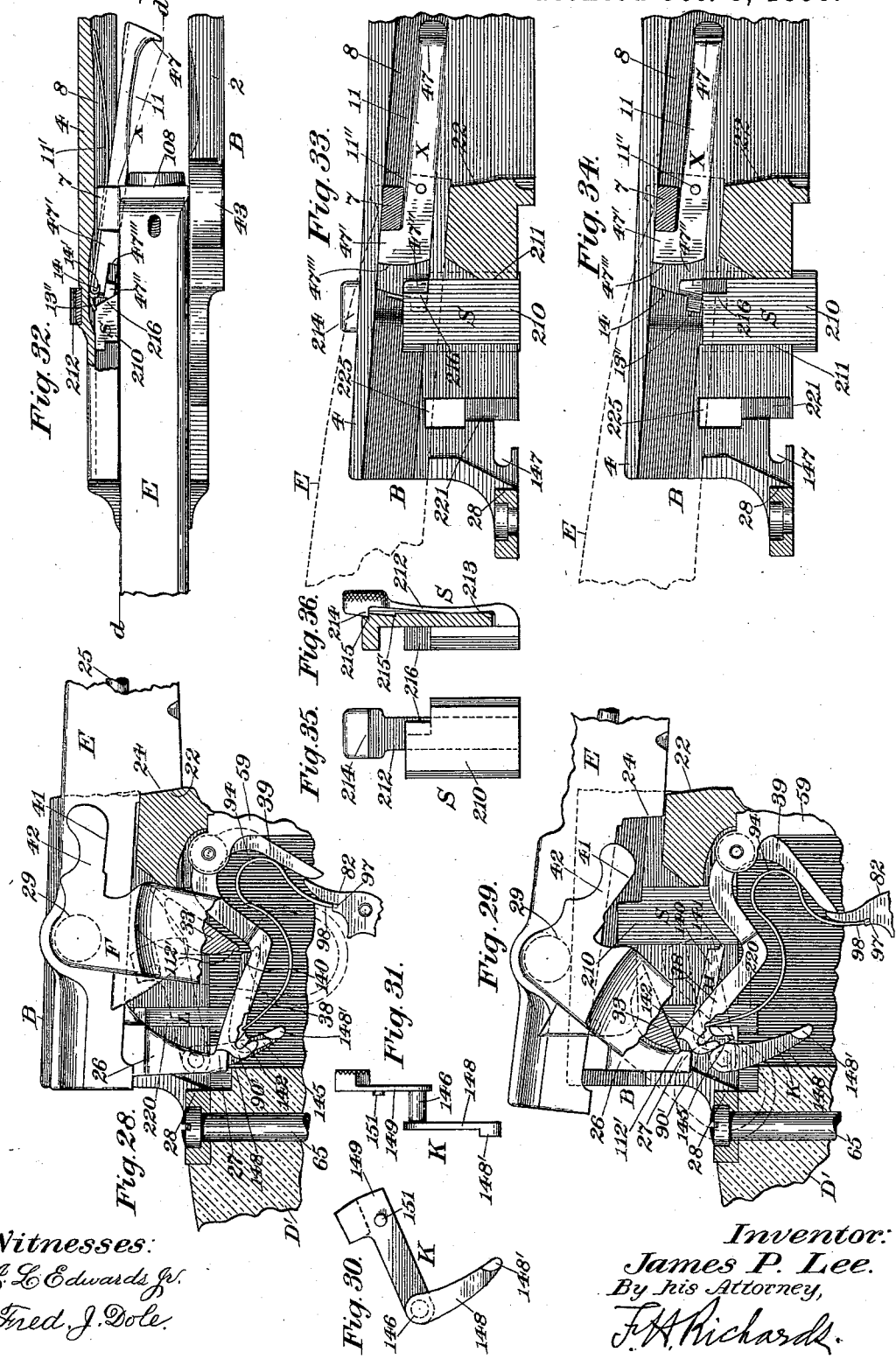

(No Model.) 16 Sheets—Sheet 13.
J. P. LEE.
MAGAZINE BOLT GUN.
No. 547,583. Patented Oct. 8, 1895.
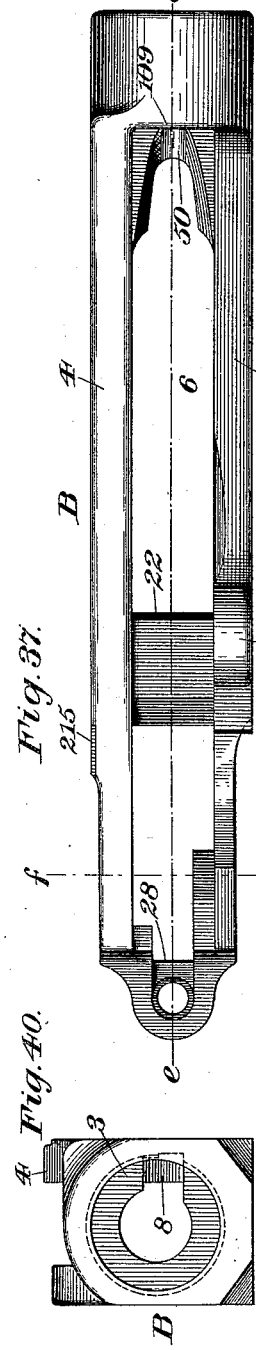
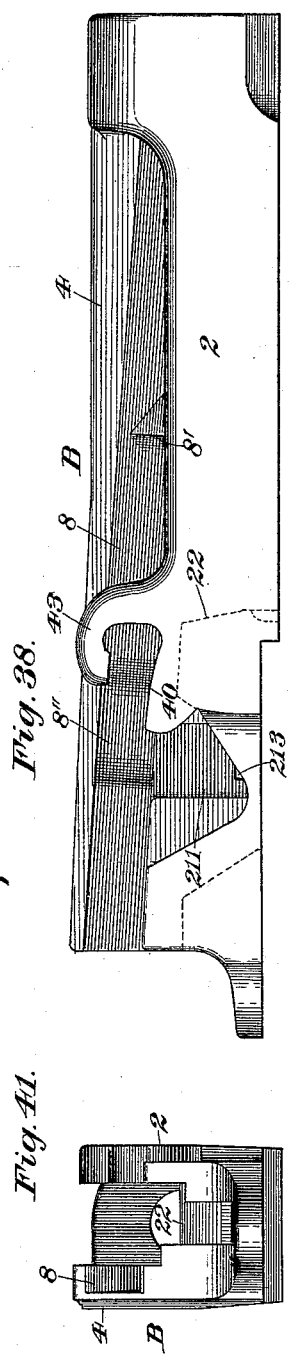
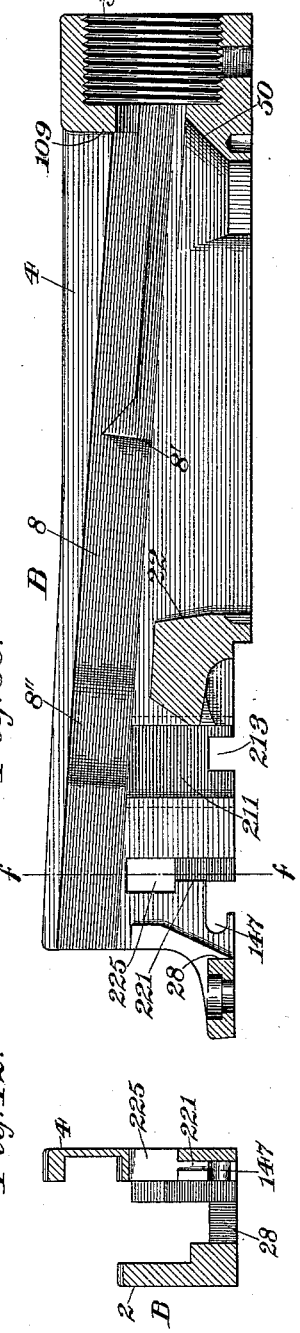
Witnesses:
J. L. Edwards Jr.
Fred. J. Dole.
Inventor:
James P. Lee
By his Attorney,
F. A. Richards.

(No Model.) 16 Sheets—Sheet 14.
J. P. LEE.
MAGAZINE BOLT GUN.
No. 547,583. Patented Oct. 8, 1895.
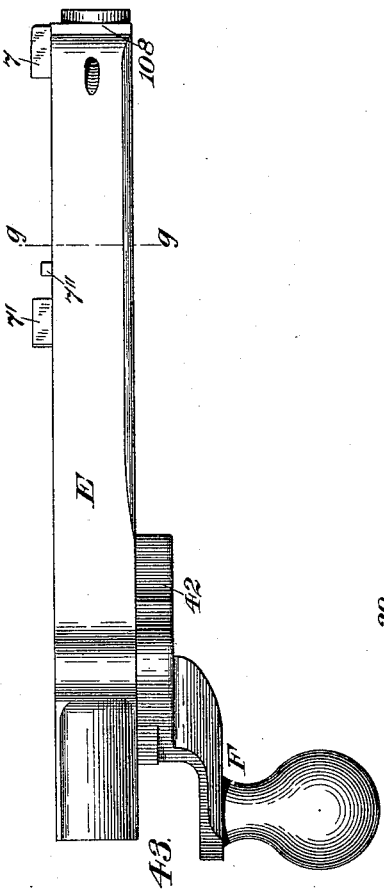
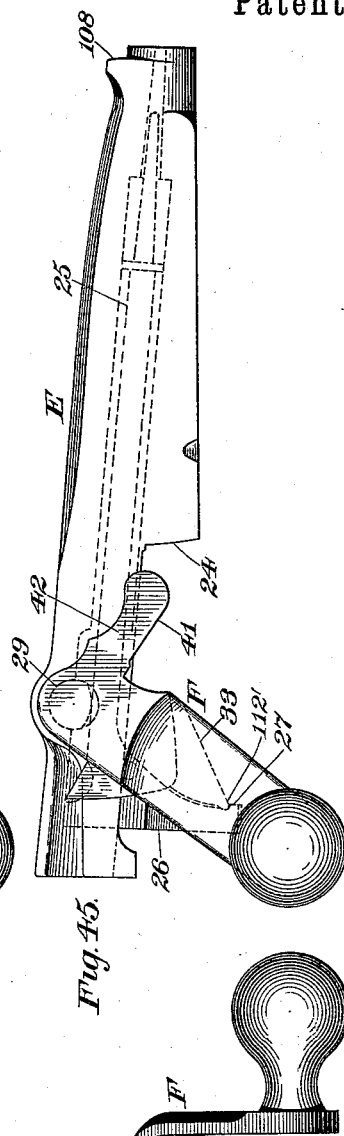
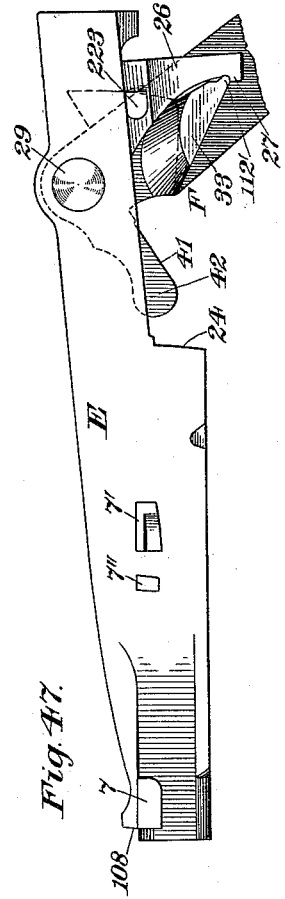
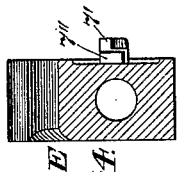
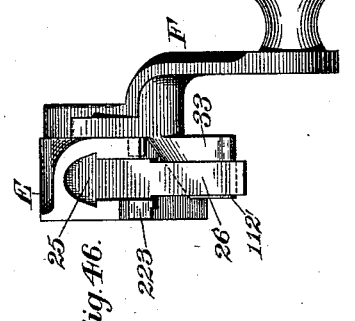
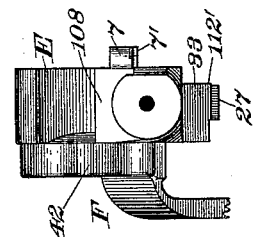
Witnesses:
J. L. Edwards Jr.
Fred. J. Dole.
Inventor:
James P. Lee.
By his Attorney,
F. H. Richards.

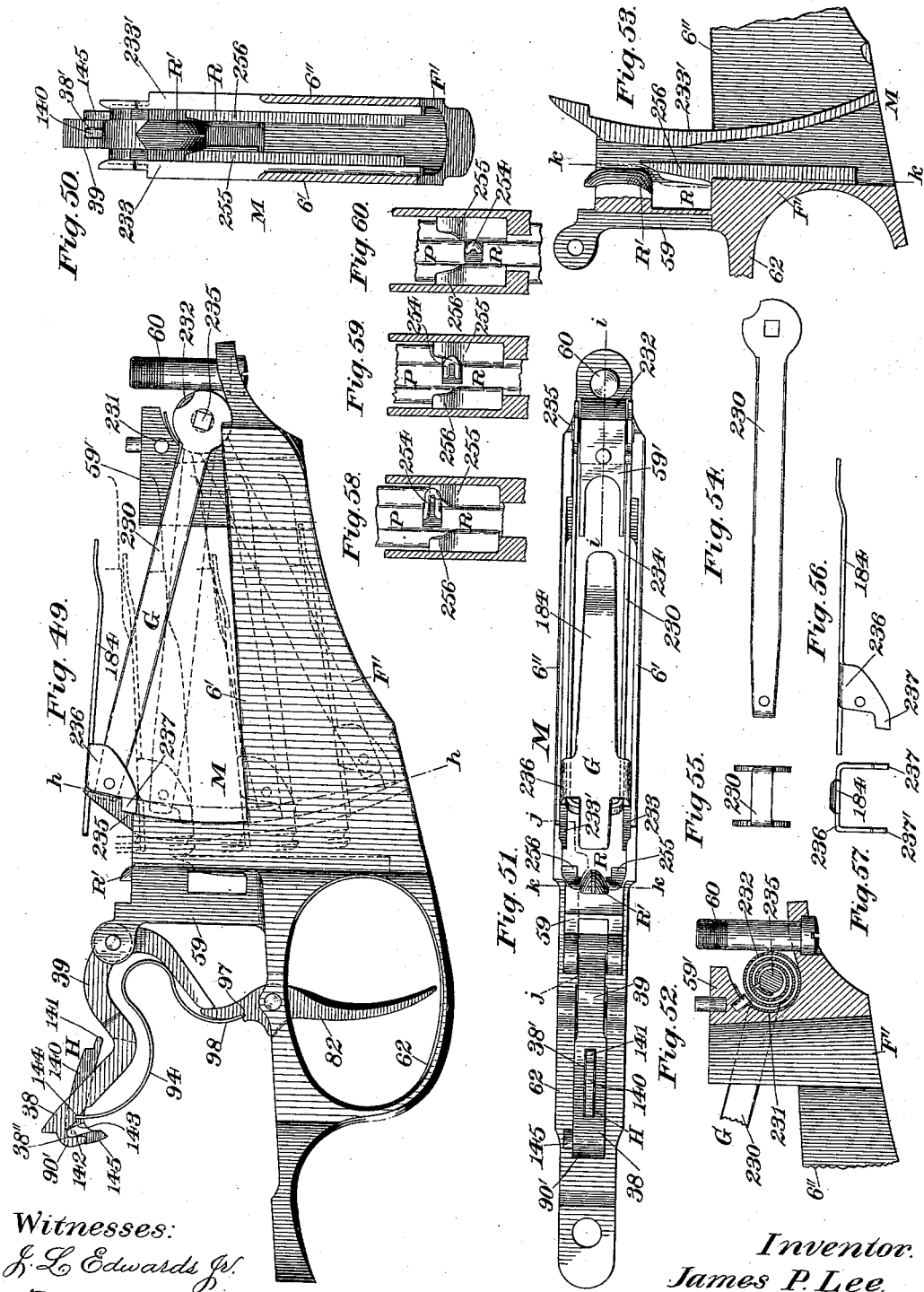

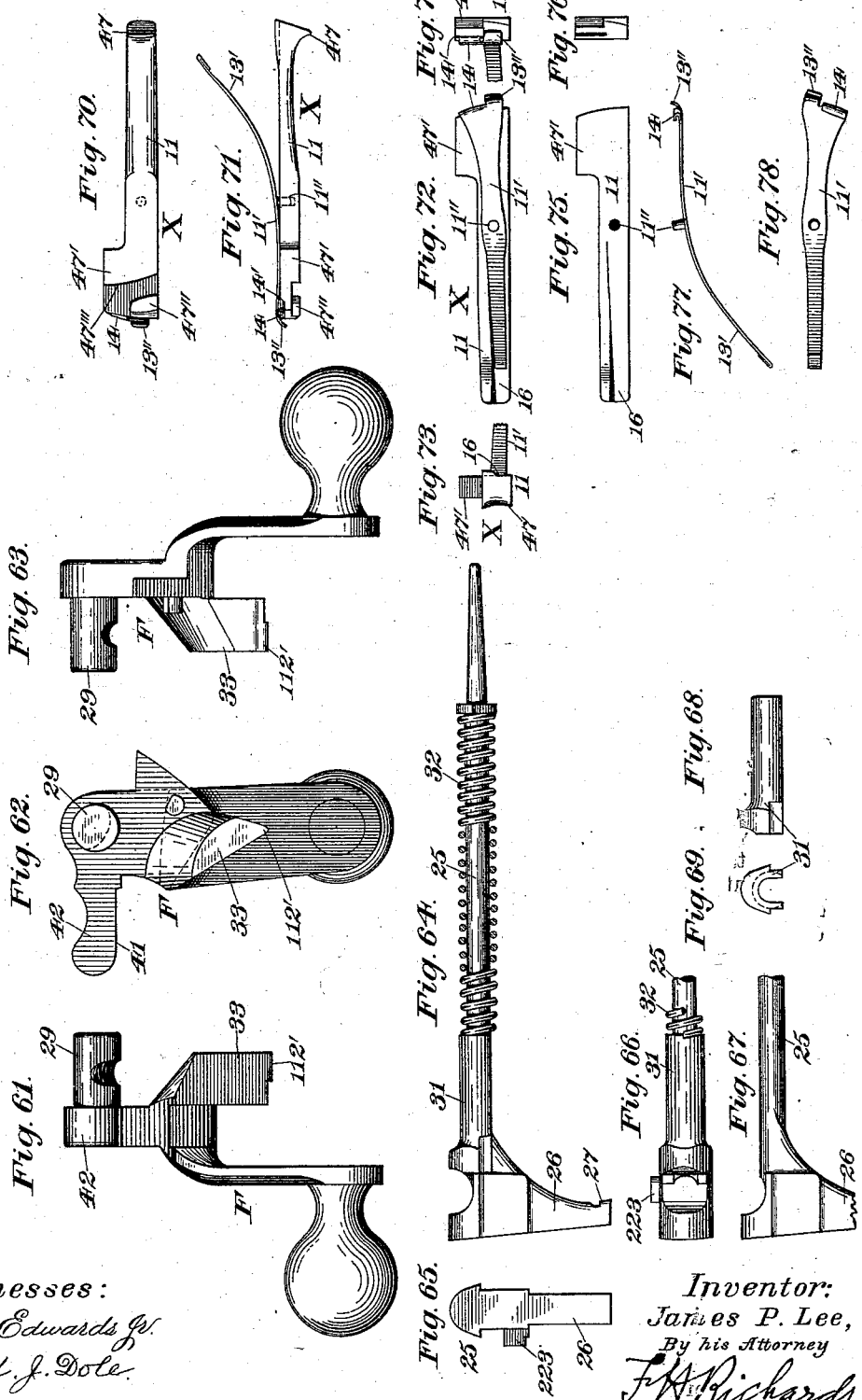

UNITED STATES PATENT OFFICE.

JAMES P. LEE, OF HARTFORD, CONNECTICUT.

MAGAZINE BOLT-GUN.

SPECIFICATION forming part of Letters Patent No. 547,583, dated October 8, 1895.

Application filed July 11, 1895. Serial No. 555,608. (No model.)

*To all whom it may concern:*

Be it known that I, JAMES P. LEE, a citizen of the United States, residing at Hartford, in the county of Hartford and State of Connecticut, have invented certain new and useful Improvements in Bolt-Guns, of which the following is a specification.

This invention relates to that class of firearms known as "bolt-guns."

Certain features of my present invention are in the nature of improvements upon certain features of the bolt-gun shown and described in Letters Patent of the United States No. 513,647, granted to me January 30, 1894, to which reference may be had; whereas, certain other features of my present invention are not disclosed.

The object of my invention is primarily to furnish a gun of the class specified embodying improved and simplified mechanism whereby the sliding bolt may be actuated to force a cartridge into the firing-chamber of the gun-barrel without imparting thereto rotary movement on its longitudinal axis, and may be closed and held in its closed position against accidental movement when firing the cartridge without the necessity of positively locking the bolt in its closed position.

Another object of my invention is to provide in connection with a gun of the class specified improved and effective means for extracting and ejecting the cartridge-shell; also to provide effective means for positively locking the firing-pin against movement when in its cocked position, to thereby prevent an accidental discharge of the gun and hold the parts in readiness for immediate firing action; also to provide improved means for elevating the cartridges and for controlling the positions of said cartridges during the operation of lifting them into position to be forced into the firing-chamber of the gun; also to provide effective means for automatically releasing the cartridges from the cartridge-clips as the cartridge-packet is inserted into the magazine of the gun, to thereby facilitate the operation of charging the magazine; also to provide improved means for limiting the retractive movement of the sliding bolt, and also for facilitating the complete withdrawal of the sliding bolt from its receiver.

Figure 6:
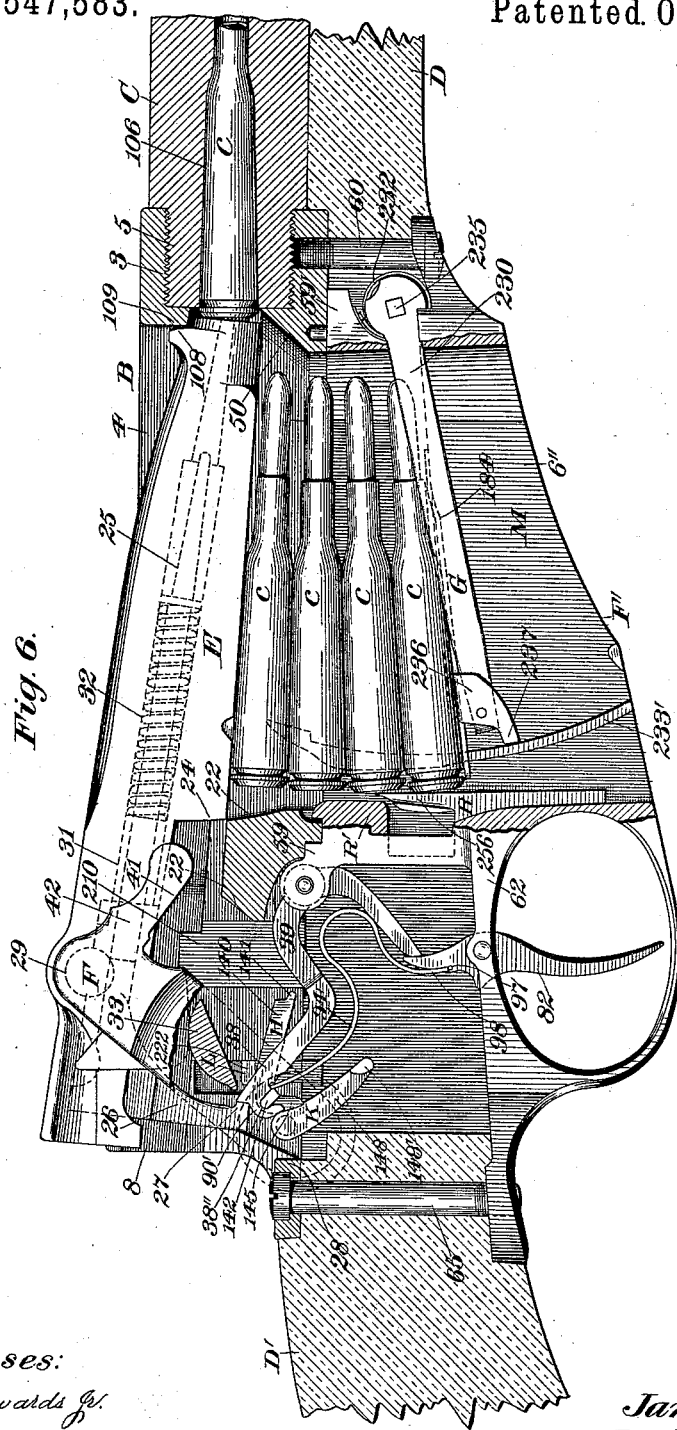
Figure 14:
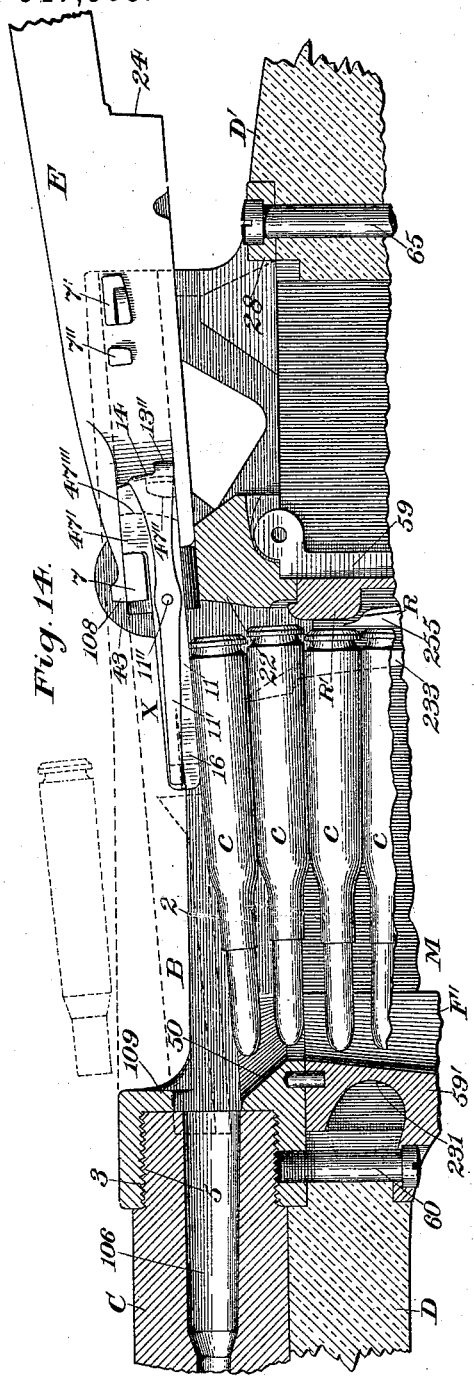
Figure 15:
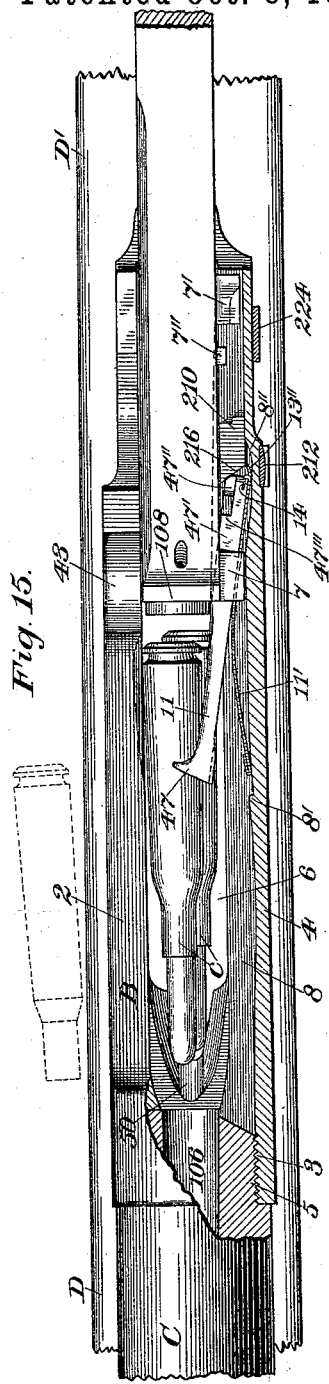
Figure 24:
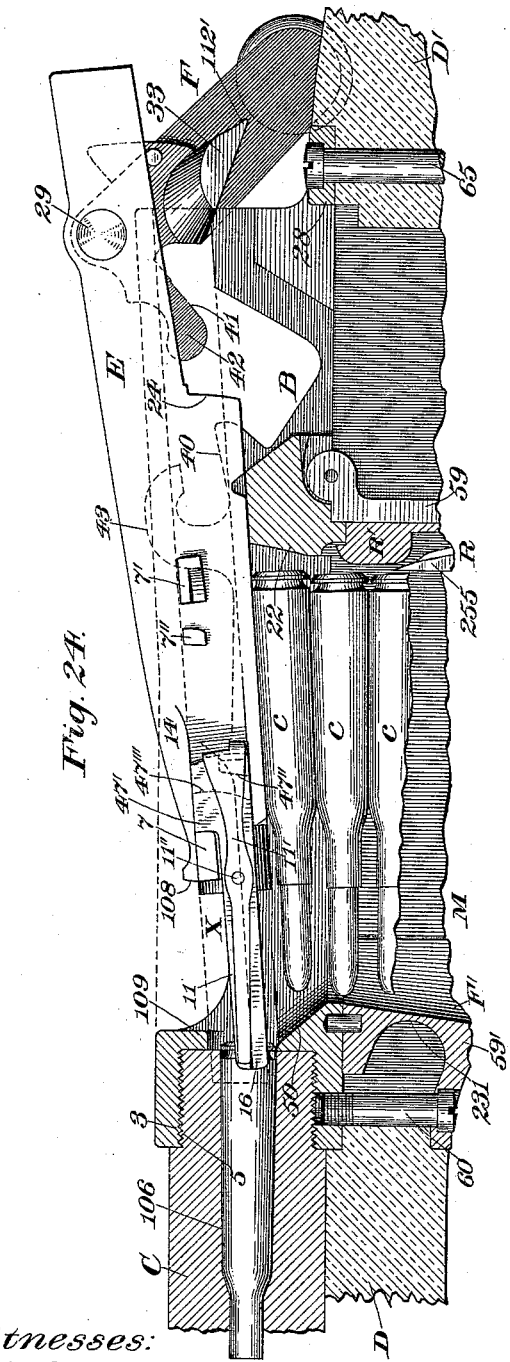
Figure 25:
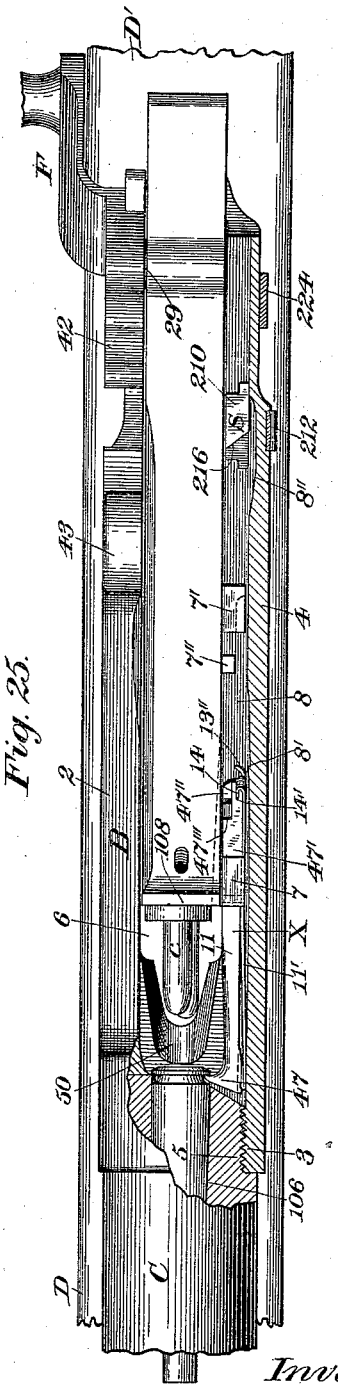

In the drawings accompanying and forming part of this specification, Figure 1, Sheet 1, is a side elevation of a portion of a bolt-gun embodying my present invention. Fig. 2, Sheet 1, is a plan view of a cartridge-packet especially adapted for use in connection with the gun shown in Fig. 1. Fig. 3, Sheet 1, is a side elevation of said cartridge-packet as seen from the under side in Fig. 2. Fig. 4, Sheet 1, is an end view of the cartridge-packet as seen from the left hand in Fig. 3. Fig. 5, Sheet 2, is a side elevation, partially in section, of a portion of my improved bolt-gun, said figure showing the sliding bolt withdrawn its full stroke, and also illustrating in full and dotted lines the manner in which a cartridge-packet is inserted into the magazine and the manner in which the clip thereof is released from the cartridges, the packet being shown in full lines in its proper working position in the magazine of the gun, one of the cartridges being shown in position to be engaged and be moved forward by the sliding bolt upon the advancing movement of said bolt, and the cartridge-packet being also shown in dotted lines as just being entered into the magazine of the gun from above. This figure also shows the cartridge-clip as dropping out of the magazine of the gun after having been unlocked or released from the cartridges, which release occurs when the packet is in the position shown in full lines in said figure. Fig. 6, Sheet 3, is a side elevation, partially in section, similar to Fig. 5, Sheet 2, showing the bolt mechanism and firing-pin mechanism in the positions they occupy when the bolt is at the end of its forward stroke and just preparatory to being closed by a downward and forward movement of the bolt-actuator, and shows the firing-pin retracting-arm of the actuator disengaged from the catch of the firing-pin arm. Fig. 7, Sheet 4, is a vertical longitudinal section of a portion of the gun, showing the bolt mechanism and firing-pin mechanism in the positions they occupy when the bolt is "dead-locked" and in its extreme forward closed position with the firing-pin retracted and the gun in condition to be fired. Fig. 8, Sheet 4, is a view similar to Fig. 7 of a portion of a gun mechanism showing said figure, and shows the firing-pin released from the sear and ocked in its cocked or retracted position, the trigger being adapted for idle movement when the parts are in the positions just described. Fig. 9, Sheet 4, is a cross-sectional view of a portion of the gun, said section being taken in dotted line *a a*, Fig. 8, and showing the parts at the left hand from said line as seen from the right hand thereof. Fig. 10, Sheet 4, is a detail in side elevation of a firing-pin locking device as seen from the right hand in Fig. 9. Fig. 11, Sheet 4, is an end view of the firing-pin locking device as seen from the under side in Fig. 10. Fig. 12, Sheet 4, is a view of the portion of the left-hand side of the receiver of the gun, showing the firing-pin locking device, the "dead-lock" actuator for the sliding bolt, and the movable bolt-stop for limiting the retractive movement and enabling the withdrawal of the bolt. Fig. 13, Sheet 5, is a vertical longitudinal section of a portion of the gun similar to Fig. 7, showing the parts thereof in the positions they occupy when the bolt is in its extreme forward closed position and the firing-pin has been released from the sear by a movement of the trigger and has effected the discharge of the cartridge. Fig. 14, Sheet 6, is a vertical longitudinal section of a portion of the gun as seen from the left-hand side of said gun, parts of the gun mechanism being shown in side elevation. This figure shows the bolt and the extracting-ejector in their relative and fully-retracted positions, the extracting-ejector being shown as thrown inward transversely of the longitudinal axis of the bolt and in the position it occupies when ejecting a cartridge-shell. Fig. 15, Sheet 6, is a plan view, partially in section, of a portion of the gun, showing the parts illustrated in Fig. 14 in the positions illustrated in said figure. Fig. 16, Sheet 7, is a sectional view similar to Fig. 14, and shows the bolt in an intermediate position and in the position it occupies after it has moved a cartridge forward sufficiently far to bring the head thereof into juxtaposition with the extracting-ejector. At this stage in the forward movement of the bolt the head of the cartridge is impinged slightly between the prong of the extracting-ejector and the forward end of the bolt. Fig. 17, Sheet 7, is a plan view similar to Fig. 15, showing the same parts in the positions illustrated in Fig. 16. Fig. 18, Sheet 8, is a sectional view of the gun similar to Figs. 14 and 16, and shows the bolt in its forward position ready to be closed, as also illustrated in Fig. 6, and also shows the extracting-ejector in engagement with the head of the cartridge, which cartridge has, at this stage of the operation, been forced to the end of its movement into the firing-chamber of the gun, and also shows the extractor in the position it occupies just preparatory to its actuation by the extractor-operating cam, which cam is thrown into engagement with a cam-face upon the extractor during the last stages of the closing movement of the bolt. Fig. 19, Sheet 8, is a plan view showing the parts illustrated in Figs. 15 and 17 in the position thereof shown in Fig. 18. Fig. 20, Sheet 8, is a cross-sectional view of a portion of the bolt-gun, taken in dotted line *b b*, Fig. 19, and looking toward the left hand in said figure, this figure being intended to show the position of the extractor-hook relatively to the cartridge-head. Fig. 21, Sheet 9, is a sectional view similar to Figs. 14, 16, and 18, and shows the bolt in the extreme forward closed position illustrated in Fig. 13, with the extractor drawn slightly backward from the position thereof shown in Figs. 18 and 19 to bring the cartridge-head in close contact with the forward end of said bolt, this being the position of the parts when the gun is ready to be fired. Fig. 22, Sheet 9, is a plan view similar to Figs. 15, 17, and 19, and shows the same parts in the positions illustrated in Fig. 20. Fig. 23, Sheet 9, is a cross-sectional view of a portion of the bolt-gun, taken in dotted line *c c*, Fig. 22, and looking toward the left hand in said figure, this figure being intended to more clearly illustrate the position of the extractor-hook relatively to the cartridge-head. Fig. 24, Sheet 10, is a sectional view similar to Figs. 14, 16, 18, and 21, and shows the bolt retracted a short distance and in the position it occupies at that stage of the retractive movement where it strikes and inaugurates the retractive movement of the extractor to start the cartridge-shell of the firing-chamber, the bolt in its retractive movement moving independently of the extractor until it reaches the position shown in said Fig. 24, after which the extractor is carried backward with said bolt. Fig. 25, Sheet 10, is a plan view similar to Figs. 15, 17, 19, and 22, and the same parts in the positions thereof illustrated in Fig. 25. Fig. 26, Sheet 11, is a sectional view similar to Figs. 14, 16, 18, 21, and 24, and shows the bolt further retracted from the position shown in Fig. 24, and shows the cartridge-shell drawn nearly out of the firing-chamber of the gun. This figure illustrates the position of the bolt and extractor just previous to the ejecting operation of said extractor, which ejection takes place when the bolt and extractor reach their fully-retracted positions. (Shown most clearly in Fig. 14.) Fig. 27, Sheet 11, is a plan view similar to Figs. 15, 17, 19, 22, and 25, and shows the same parts in the positions thereof illustrated in Fig. 26. Fig. 28, Sheet 12, is a side view, partially in section, of a portion of the bolt-gun as seen from the right-hand side thereof, and shows a portion of the bolt and firing-pin in the positions they occupy when the dead-lock actuator has been depressed to throw the dead-lock out of engagement with the depending arm of the bolt-actuator, to enable an opening and retractive movement of the bolt and permit the withdrawal of a cartridge from the firing-chamber. Fig. 29, Sheet 12, is a side elevation similar to Fig. 28, showing the same parts in the positions they occupy after the dead-lock has released the depending arm of the bolt-actuator and the bolt has been opened or elevated to permit a retractive movement of said bolt. Fig. 30, Sheet 12, is a detail in side elevation of the dead-lock actuator. Fig. 31, Sheet 12, is a front view of said dead-lock actuator as seen from the right hand in Fig. 30. Fig. 32, Sheet 12, is a plan view, partially in section, of a portion of the gun, showing a portion of the receiver and sliding bolt, and also showing the extractor and the movable stop-abutment or limiter for limiting the retractive movement of the bolt, said figure being intended to illustrate the relation of the movable stop-abutment relatively to the bolt and extractor. Fig. 33, Sheet 12, is a longitudinal section taken in dotted lines $d\,d$, Fig. 32, looking upward in said figure and showing the same parts in the same positions shown in said figure, the movable stop-abutment being shown elevated in said Fig. 33 and in the path of movement of the extractor. Fig. 34, Sheet 12, is a sectional view similar to Fig. 33, showing the same parts with the movable stop-abutment or limiter depressed out of the path of movement of the extractor. Fig. 35, Sheet 12, is a detail of the movable stop-abutment or limiter in side elevation as seen from the inner side thereof. Fig. 36, Sheet 12, is a front view of the movable stop-abutment or limiter as seen in Fig. 32, a portion of the gun-receiver being shown in cross-section, said figure illustrating the means for holding the limiter in its adjusted position relatively to the receiver. Fig. 37, Sheet 13, is a plan view of the receiver for the sliding bolt. Fig. 38, Sheet 13, is a side elevation of said receiver as seen from the under side in Fig. 37. Fig. 39, Sheet 13, is a vertical longitudinal section of the receiver, taken in dotted line $e\,e$, Fig. 37, and looking upward in said figure. Fig. 40, Sheet 13, is an end view of the receiver as seen from the right hand in Fig. 37. Fig. 41, Sheet 13, is an end view of the receiver as seen from the left hand in Fig. 38. Fig. 42, Sheet 13, is a cross-sectional view of the receiver, taken in dotted line $f\,f$, Figs. 37 and 39, and as seen from the right hand in said figure. Fig. 43, Sheet 14, is a plan view of the sliding bolt and its actuator detached from the magazine. Fig. 44, Sheet 14, is a cross-sectional view taken in line $g\,g$, Fig. 43, and showing a portion of the bolt at the left hand of said line. Fig. 45, Sheet 14, is a side elevation of the bolt and actuator shown in Fig. 43 as seen from the under side in said figure, and also showing in full and dotted lines the firing-pin carried by said bolt. Fig. 46, Sheet 14, is an end view of the parts illustrated in Fig. 45 as seen from the left hand in said figure. Fig. 47, Sheet 14, is a side elevation of the parts illustrated in Fig. 45 as seen from the left hand in Fig. 46, a portion of the actuator being broken away. Fig. 48, Sheet 14, is an end view of the parts illustrated in Fig. 47 as seen from the left hand in said figure. Fig. 49, Sheet 15, is a side elevation of the magazine-frame, trigger-guard block, a portion of the trigger mechanism, and the cartridge elevating and controlling device, said figure showing in full and dotted lines the cam for controlling the successive positions of the cartridge-lifter, and also showing in full and dotted lines the cartridge-lifter in a series of the successive positions assumed thereby in elevating the cartridges. Fig. 50, Sheet 15, is a vertical cross-sectional view of the parts shown in Fig 49, said section being taken in dotted line $h\,h$, Fig. 49, and showing the parts at the left hand of said dotted line as seen from the right hand thereof, the cartridge-lifter not being shown. Fig. 51, Sheet 15, is a plan view of the parts shown in Fig. 49. Fig. 52, Sheet 15, is a vertical longitudinal section of a portion of the magazine-frame, taken in dotted line $i\,i$, Fig. 51, and showing a portion of the cartridge-lifter and its actuator. Fig. 53 is a vertical longitudinal section of a portion of the magazine-frame, trigger-guard, and guard-block, taken in dotted line $j\,j$, Fig. 51, looking upward in said figure and showing a cartridge-packet limiter or stop-abutment and the cartridge-unlocking means. Fig. 54, Sheet 15, is a side view of a carrying member of the cartridge-lifter. Fig. 55, Sheet 15, is an end view of said carrying member as seen from the left hand in Fig. 54. Fig. 55, Sheet 15, is a side view of the cartridge-supporting member or platform of the cartridge-lifter. Fig. 57, Sheet 15, is an end view of said cartridge-supporting member as seen from the left hand in Fig. 56. Figs. 58, 59, and 60, Sheet 15, are cross-sectional views of the magazine-frame, taken in dotted line $k\,k$, Figs. 51 and 53, looking toward the right hand in said figures and showing, respectively, a portion of the cartridge-packet in rear elevation and in three successive positions relatively to the cartridge-unlocking means, said figures being intended to illustrate the operation of automatically actuating the cartridge-locker during the insertion of the cartridge-packet in the magazine to automatically release the cartridges. Fig. 61, Sheet 16, is a front end view of the sliding-bolt actuator as seen from the left hand in Fig. 62. Fig. 62, Sheet 16, is a side view of the bolt-actuator as seen from the right hand in Fig. 61. Fig. 63, Sheet 16, is a rear view of the bolt-actuator as seen from the right hand in Fig. 62. Fig. 64 is a side view, partially in section, of the firing-pin and spring assembled. Fig. 65, Sheet 16, is an end view of the firing-pin as seen from the left hand in Fig. 64. Fig. 66, Sheet 16, is a plan view of a portion of the firing-pin as seen from above in Fig. 64. Fig. 67, Sheet 16, is a side view of a portion of the rearward end of the firing-pin minus the abutment-sleeve for the firing-spring. Fig. 68, Sheet 16, is a side view of the spring-abutment sleeve detached. Fig. 69, Sheet 16, is an end view of said sleeve as seen from the left hand in Fig. 68. Fig. 70, Sheet 16, is a side view of the combined extractor and ejector as seen from below in Fig. 71. Fig. 71, Sheet 16, is a plan view of said combined extractor and ejector as seen from above in Fig. 70. Fig. 72, Sheet 16, is a side view of the combined extractor and ejector as seen from above in Fig. 71, the position of the extractor being reversed from that shown in Fig. 70. Fig. 73 is an end view of the parts shown in Fig. 72 as seen from the left hand in said figure, a portion of the ejector-spring being broken away. Fig. 74, Sheet 16, is an end view of the parts shown in Fig. 72 as seen from the right hand in said figure, a portion of the ejector-spring being broken away. Fig. 75, Sheet 16, is a side view of the extractor minus the ejector-spring as seen from above in Fig. 71. Fig. 76, Sheet 16, is an end view of said ejector as seen from the right hand in Fig. 75. Fig. 77, Sheet 16, is an edge view of the ejector-spring detached, and Fig. 78, Sheet 16, is a side view of said spring as seen from above in Fig. 77.

Similar characters designate like parts in all the figures of the drawings.

For convenience of comparison between the specification and drawings and for the purpose of securing a clearer understanding of the description, the terms "right-hand" and "left-hand" are employed in describing certain portions of the gun to denote those portions of the gun at the right and left hand sides, respectively, of the longitudinal axis thereof when viewed from the left-hand end or butt of the gun, as shown in Fig. 1, Sheet 1, of the drawings, and by "forward" and "rearward" are meant those portions of the gun nearest the right-hand and left-hand ends, respectively, thereof, as shown in said figure.

In the preferred form thereof herein shown the framework of the gun—which includes the magazine-frame F', the trigger-guard plate 62, and the guard-block 59, the stock D, the barrel C, the receiver B, (which receives the sliding bolt,) the sliding bolt E, the bolt-actuator F, the firing-pin 25, the firing-pin spring 32, the sear 39, the sear-spring 94, the back lock H for the bolt, the back-lock actuator K, and the trigger 82—is in a general way similar in construction and organization to like parts shown, described, and designated by like characters in Patent No. 513,647, hereinbefore referred to.

The receiver, which is designated in a general way by B, is constructed and adapted for carrying a sliding bolt E, and has a stop-abutment 22 adapted to co-operate with a similar abutment 24 upon the bolt E for sustaining said bolt, when this is closed and in the position illustrated in Fig. 7, Sheet 4, and Fig. 13, Sheet 5, against recoil, consequent to the discharge of a cartridge.

In the preferred form thereof herein shown the receiver B is in the nature of an open frame having the two side walls 2 and 4 joined at their front and rear ends, and constructed for carrying the gun-barrel C, also for attachment to the stock D of the gun, and also for receiving within it the bolt mechanism. At the front end thereof the receiver has an axial threaded bore 3 (see Fig. 39, Sheet 13) for receiving the threaded butt-end 5 of the barrel C. A mortise 6 (see Fig. 37, Sheet 13) is formed vertically and longitudinally through the receiver, near the forward end thereof, through which a cartridge-packet—as shown, for instance, in Figs. 2, 3, and 4, Sheet 1—may be inserted into the magazine proper of the gun when said gun is used as a magazine-gun, or through which each individual cartridge may be inserted and positioned to be engaged and forced into the firing-chamber of the gun by the sliding bolt when the gun is used as a single-loader.

The magazine or cartridge-receiving chamber of the gun is located between the two side walls 6' and 6'' of the magazine-frame F', said magazine-frame being vertically and longitudinally mortised to form the magazine, which is designated in a general way by M. This frame F' has a trigger-guard plate 62, a vertical guard-block 59, similar in a general way to like parts in the patent hereinbefore referred to, and also has a vertical block 59' at the forward end thereof adapted for constituting a bearing, as will be hereinafter described, for the cartridge-lifter, (designated in a general way by G,) said frame F' being secured to the tip-stock D and butt-stock D', at the front and rear ends thereof, respectively, by means of the screw-bolts 60 and 65, respectively, which also secure said frame to the receiver B in the usual manner. This frame F' embodies novel features adapted for holding the cartridge-clip against lifting movement in the magazine and also for unlocking said clip to release the cartridges, which will be hereinafter fully described.

Upon the left-hand side of the bolt E, at the forward end thereof, is formed a projection 7, which fits into a groove 8, formed upon the inner side of the left-hand wall 4 of the receiver, and guides the bolt in its forward and rearward movements. This projection also constitutes a stop for limiting the rearward movement of the bolt relatively to the extractor, which extractor is designated in a general way by X, said bolt being also provided upon its left-hand face and at a point at some distance in the rear of the projection 7 with another projection or stop 7' for limiting the forward movement of said bolt relatively to the extractor, and being also provided upon this face with a cam-like projection 7'', which is shown located a short distance in advance of the rear stop 7', and constitutes a cam adapted for co-operation with a similar cam upon the retractor, as will be hereinafter fully described, for forcibly retracting the extractor a short distance upon the closing movement of the bolt E.

The extractor (designated in a general way by X) which, in connection with its actuating means, constitutes one of the features of my present invention, has several separate and distinct functions. It constitutes an extractor for withdrawing the cartridge-shell from the firing-chamber 106 of the gun. It further constitutes a lever or draw-bar for forcibly drawing the cartridge-head against the end of the bolt E after the cartridge has been forced by the bolt into the firing-chamber. It further constitutes a "cut-off" or stop for limiting the vertical movement of the cartridges in the magazine. It further constitutes an ejector for ejecting the shell after the same has been withdrawn from the firing-chamber; and it further constitutes a stop adapted for co-operation with a movable stop-abutment upon the receiver for limiting the retractive movement of the bolt, all of which will be hereinafter fully described.

The extractor X, which, owing to its multiplex function, will sometimes be herein referred to as the "combined extractor and ejector," is fitted for sliding movement in the longitudinal groove or guideway 8 in the left-hand wall 4 of the receiver in position and adapted to be actuated by the sliding bolt E, with which said extractor co-operates to perform its functions.

In the preferred form thereof herein shown the combined extractor and ejector X consists of a rigid extracting member 11 and a resilient ejecting member 11'. The ejecting member 11' is shown interposed between the inner face of the wall 4 of the receiver and the adjacent face of the rigid extracting member 11 and has a pivotal connection with said extracting member and near the middle portion thereof, as shown at 11'', said pivotal connection preventing longitudinal movement of the ejecting member relatively to the extracting member, but permits a limited amount of swinging movement thereof relatively to said extracting member. The extracting member 11 is in the nature of a rigid bar having at its forward end an inwardly-projecting extractor-hook 47 and having at its rearward end a vertically-projecting abutment or head 47', adapted, when the extractor is in operative position in the receiver of the gun, for engaging the forward and rearward stops upon the sliding bolt during the retracting and advancing of said bolt, as will be hereinafter more fully described. Upon the inner face of the extrator and at or near the rearward end thereof is a cam-like projection 47'', adapted for co-operating with the similar cam-like projection 7'' upon the left-hand face of the sliding bolt E for effecting a partial retractive movement of the extractor relatively to the bolt upon the closing movement of the bolt, as will be understood by comparison of Figs. 14 to 27, inclusive, upon Sheets 6 to 11, inclusive, of the drawings.

As will be seen by reference to Fig. 15, Sheet 6, and Fig. 71, Sheet 16, of the drawings, the ejecting member 11, which is preferably formed of sheet-steel and tempered to the form shown in said figures, is bowed outward at its free end, as shown at 13', and is bent inward at its rear end, as shown at 14, to form a catch, which engages in a notch 14', formed vertically in the rear end of the extracting member 11, as shown in said Fig. 71, and also has a longitudinal extension 13'' at the rearward end thereof, which is bent slightly inward, and is adapted to be engaged by a projecting part of the rearward stop-abutment 7' upon the sliding bolt E, by means of which the rearward end of the ejecting member or spring is depressed to throw the forward end thereof upward out of the groove 16 in the side face of the extracting member, in which groove the forward end of the ejecting member rests during the latter stages of the advancing movement of the bolt E. The forward end of the groove 8 of the receiver communicates with the firing-chamber 106 of the barrel C, and is approximately of a depth equal to the length of the end face of the extractor-hook 47, as will be understood by reference to Fig. 39, Sheet 13, and Fig. 19, Sheet 8.

As a means for holding the extractor against forward movement during the first stages of the forward movement of the bolt E, the inner wall of the groove 8 of the receiver has a slight offset 8' in position and adapted to be engaged by the forward end of the ejecting member or spring 11' and be held thereby until the forward end of the bolt has moved the upper cartridge of the series of cartridges c in the magazine of the gun sufficiently forward to bring the head of said cartridge into engagement with the hook 47 of the extractor and with sufficient force as to cause the end of the ejecting-spring to override the offset 8', after which the extractor will be carried forward with the bolt.

For the purpose of allowing an increased transverse movement of the rearward end of the extractor when said extractor is in its extreme retracted and ejecting position, as is required for procuring the requisite ejecting-throw to said extractor, the inner wall of the groove 8 in which the extractor runs has a depression 8'' in juxtaposition to the rearward end of the extractor when said extractor is in its extreme retracted position, as will be seen by reference to Fig. 15, Sheet 6.

As a means for normally limiting the backward stroke of the sliding bolt, and also as a means for actuating the extractor to impart a sudden transverse ejecting movement thereto, I have provided an extractor-actuating stop-abutment, (designated in a general way by S,) which is movably carried by the receiver, and is adapted to be shifted into and out of the path of movement of the ejecting-extractor. This extractor-actuating stop abutment or limiter, in the preferred form thereof herein shown, consists of the abutment-block 210, fitted for sliding movement in a vertical guideway 211, formed in the inner face of the left-hand wall of the receiver, and having an actuator-arm 212, which extends through a slot 213 in said receiver and lies against the outer face of the wall 4. This actuator-arm, which is in the nature of a spring-arm adapted to bear tightly against the outer face of the receiver, has an inward projection or catch 214 near its upper end adapted for engaging in notches 215 and 215', formed in the outside face of the left-hand wall of the receiver to hold said stop-abutment in its effective or ineffective positions relatively to the ejecting-extractor, as will be understood by a comparison of Figs. 32 to 36, inclusive, Sheet 12, of the drawings. At the upward end of the abutment-block 210 said block is beveled or inclined inwardly and transversely to form an extractor-actuating cam or cam-face 216, which cam or cam-face is in position for engaging the rearward end of the extractor during the latter stages of the retractive movement thereof and is adapted for abruptly throwing the rearward end of said extractor sidewise and outwardly to effect an inward movement of relatively-high velocity of the forward end of said extractor, whereby the cartridge-shell extracted by the extractor will be quickly thrown out of the receiver with considerable velocity.

By the provision of an extractor-actuating stop-abutment such as described I am not only enabled to positively limit the backward movement of the bolt E relatively to the receiver when the stop-abutment is in the position shown most clearly in Fig. 33, Sheet 12, of the drawings, and at the same time effect the ejection of the cartridge shell from the receiver, but I am also enabled to facilitate the complete withdrawal of the bolt E from the receiver, it being simply necessary when it is desired to effect the complete withdrawal of the bolt to spring the actuating-arm 212 of the abutment-block 210 out of locked engagement with the receiver and press the same downward to carry the abutment-block to the position shown in Fig. 34, Sheet 12, of the drawings, and out of the path of movement of the extractor.

By reference to Figs. 14 to 27, inclusive, Sheets 6 to 11, inclusive, which figures illustrate in sectional, side, and plan views six successive positions of the sliding bolt and combined extractor and ejector during the operation of forcing a cartridge into the firing-chamber of the gun and extracting and ejecting the cartridge-shell, it will be seen that the extractor has no fixed connection with the sliding bolt E, as is common in bolt-guns of ordinary construction, but, on the contrary, is supported to slide freely in the longitudinal groove 8 of the receiver, and also has a limited amount of free movement longitudinally of the sliding bolt. The longitudinal movement of the extractor relatively to the bolt is limited by the remotely-disposed front and rear stop-abutments upon the side face of said bolt, as hereinbefore described, which alternately engage the rearward and forward faces of the head 47' of the extractor during the forward and backward movements of the bolt, said bolt being free to move, independently of the extractor, a distance equal to the distance between these abutments.

Referring to Figs. 14 to 27, Sheets 6 to 11, inclusive, in Figs. 14 and 15 the sliding bolt and extracting device are shown in their extreme retracted positions, or in the positions they occupy preparatory to the inauguration of the forward movement of the bolt and during the ejection of a cartridge-shell. In this position of the parts the extracting device has been actuated by the cam-face of the stop-abutment S to throw the forward end of the extractor inward beyond the longitudinal axis of the bolt to eject a cartridge-shell, the ejected cartridge-shell being shown in dotted lines. It will be noticed that in this position of the parts the forward end of the extractor extends over the upper cartridge of the remaining cartridges in the receiver and holds the upper cartridge of the series in position to be engaged by the sliding bolt upon the forward movement of said bolt, and thereby acts as a cut-off to prevent vertical movement of the cartridges in said receiver. Furthermore, in this position of the parts the forward projection or stop 7 upon the bolt is in engagement with the forward face of the head 47' of the extractor, and the ejecting-spring is in position to engage the offset 8' of the receiver-wall 4. Upon the inauguration of the forward movement of the bolt E ejecting-spring 11' is first carried forward with the extractor and into engagement with the offset 8', as shown in Fig. 17, and upon a continued forward movement of the bolt said bolt moves independently of the extractor until the upper cartridge of the series has been moved forward sufficiently to bring the head thereof into engagement with the extractor-hook 47, as illustrated in Figs. 16 and 17. A continued forward movement of the bolt E first forces the ejecting-spring 11' past the offset 8', after which the bolt is carried from the position shown in Figs. 16 and 17 to that shown in Figs. 18 and 19, which brings the extractor-actuating cam 7" upon the bolt into engagement with a bearing-face 47''' at the rear end of the extractor and carries the extractor forward with the bolt to the position shown most clearly in Fig. 18. After the bolt has reached this position a downward movement of the rearward end of said bolt will close the bolt into the position shown in Figs. 21 and 22. During the first stages in this operation of closing the bolt the projection upon the rearward stop 7' of the bolt first comes into engagement with the extension 13" at the rearward end of the ejecting-spring 11' and throws the forward end of said spring upward out of the groove 16 of the extractor, filling the space between the extractor and the inner face of the forward end of the wall of the receiver and forcing the extractor-hook 47 inward and tightly into the annular groove of the cartridge-head, thus locking said hook against movement relatively to the cartridge during the retractive movement of the extractor, after which and during the latter stages of the operation of closing the bolt the extractor-actuating cam 7″ upon the bolt is brought into contact with the similar cam 47″ upon the extractor, which forcibly draws the extractor backward a short distance and brings the head of the cartridge tightly against the forward end of the bolt, thus precluding the possibility of movement of the cartridge when said cartridge is fired.

After a cartridge has been fired, and it is desired to withdraw the cartridge-shell from the firing-chamber of the gun, the sliding bolt E is first opened relatively to the receiver and is then drawn backward to its extreme retracted position. In passing from the position shown in Fig. 21 to the position shown in Fig. 24 it does not effect any change in the position of the extractor relatively to the cartridge-shell; but when said bolt arrives at the position shown in Fig. 24, and, owing to the momentum acquired by the bolt, the forward projection 7 on the bolt strikes the forward face of the head 47′ of the extractor, a heavy blow suddenly draws the extractor backward, which forcibly starts the cartridge-shell out of the firing-chamber of the gun, after which the bolt in passing from the position illustrated in Fig. 24 to the positions shown in Figs. 26 and 14 carries the extractor and cartridge-shell backward with it until the rear end of said extractor strikes the cam 216 of the stop-abutment S, by means of which the rearward end of said extractor will be thrown abruptly sidewise, causing the forward end to be thrown inward and thus ejecting the cartridge-shell. (Illustrated in Figs. 14 and 15, Sheet 6, of the drawings.)

By the construction and organization of cartridge extracting and ejecting mechanism just described I am enabled to effect results that are highly advantageous to bolt-guns of the class specified. One advantage secured by this construction and organization of mechanism is, owing to the position of the extractor relatively to the bolt and the peculiar hammer-like action of the sliding bolt upon said extractor due to the momentum acquired by the bolt in the stages of its retractive independent movement and before it strikes the extractor, that the cartridge-shell is subjected to a drawing stress, substantially in alignment with the axis thereof, which not only facilitates the withdrawing of the cartridge-shell, but prevents accidental shearing or cutting through of the head of said shell, which sometimes occurs where the extractor is a fixture with the bolt and has a parti-circular withdrawing movement during the opening movement of the gun. Another advantage of the construction of mechanism just described is that during the closing movement of the bolt the cartridge in the firing-chamber of the gun is drawn with its head in close impingement with the forward end face of the bolt before the cartridge is fired, which is desirable, owing to the fact that should the cartridge be of a size to have slight longitudinal play in the firing-chamber of the gun when fired this play is obviated by the impingement of the head of the cartridge between the extractor-hook and the forward end face of the bolt. Furthermore, as will be understood by reference to Figs. 14 to 27, inclusive, Sheets 6 to 11, inclusive, the extractor-hook, which is thrown inward by the closing action of the bolt, is locked against the head of the cartridge and draws the cartridge back tightly against the end of the bolt before the blow of the firing-pin can move the cartridge forward, which prevents the possibility of the firing-pin raising the extractor-hook or throwing the same off from the head of the cartridge by its blow on the cartridge. This brings the cartridge-head in such relation with the end of the bolt that the cartridge cannot be driven forward away from the bolt by the action of the firing-pin, thus preventing a space being formed back of the cartridge-head and also preventing the head of the cartridge from being driven away from the body of the cartridge by the expansion of the gases upon the discharge of the cartridge, as frequently occurs in bolt-guns of ordinary construction.

The bolt E of the gun, by reason of its peculiar construction and organization relatively to the receiver and by reason of the peculiar disposition of the recoil-abutment 24 and stop-abutment 22 relatively to the plane of the bore or firing-chamber of the gun, and consequently to the line of recoil, is positively held, as will be hereinafter more fully described, as against backward movement or recoil, due to concussion arising from the discharge of the cartridge in the firing-chamber of the gun. The bearing-faces of the stop-abutment 22 on the receiver and the recoil-abutment 24 are preferably in planes when in engagement concentric to the fulcrum 109, upon which the bolt swings in its opening movement, and furthermore the stop-abutments, when the bolt is in its closed position, (illustrated in Fig. 7, Sheet 4,) intersect the horizontal plane of the bore of the gun and are at substantially right angles to and intersect the line of recoil. By locating the stop-abutments of the receiver in the line of recoil it will be seen that the full force of the blow due to concussion is received by the stop-abutment substantially at right angles to the plane of its bearing-face, and in consequence thereof the discharge of the gun will have no effect upon the bolt in so far as lifting the bolt out of its closed position is concerned.

Practical experiments with the gun herein described have demonstrated the fact that by providing the receiver of the gun with a stop-abutment having its bearing-face intersecting the plane of the bore of the gun and in the line of recoil, and by providing the bolt of the gun with a recoil-abutment adapted for engaging the stop-abutment of the receiver, the discharge of the gun when the bolt is closed and the abutments are in engagement has no perceptible effect upon the bolt and in no wise tends to lift the same out of engagement with the receiver.

The bolt E is bored longitudinally thereof, as shown in the Patent No. 513,647, to receive the firing-pin 25, and at the rearward end thereof is downwardly slotted to provide for the movement of the firing-pin arm 26, which firing-pin arm projects downwardly from the rearward end of the firing-pin through the slot in the bolt and has upon the forward side of the lower end thereof a catch 27, adapted to be engaged by the depending actuating-arm 33, as will be hereinafter more fully described. On the lowering of the bolt by a vertical movement transversely of the axis thereof into engagement with the receiver or stop-abutment and to the firing position of the gun (shown in Fig. 7, Sheet 4) the arm 26 of the firing-pin extends below the safety-abutment 28 of the receiver, so as to prevent the blowing out of the rearward end of the firing-pin should said pin by any means become broken in action. Near its rearward end, immediately above and partially intersecting the bore of the firing-pin, the bolt E is transversely bored to receive the journal 29 of the bolt-actuator, which actuator is designated in a general way by F. This journal stands, when the parts are assembled, close to the upper side of the rod 25 of the firing-pin, said actuator-journal forming the abutment for the sleeve 31, against which the firing-spring 32, carried by the firing-pin, bears.

The bolt-actuator F is shiftable from one position to another relatively to the bolt and has several functions. Among the principal of these is the lifting and lowering of the rearward end of the bolt to open and close said bolt relatively to the receiver when this is to be moved backward and after the same has been moved forward. Another function of the actuator F, besides holding the bolt E down in its closed position, is to prevent the forward movement of the firing-pin until after the bolt has been carried down to a closed firing position. The rearward side of the depending actuator-arm 33 serves, on the retracted movement of the bolt-actuator, to draw back the firing-pin from the position shown in Fig. 13, Sheet 5, to that shown in Fig. 29, Sheet 12, and upon the extraction of the actuator, as shown most clearly in Fig. 5, Sheet 2, and Fig. 29, Sheet 12, said arm passes over and the lower end or point 112′ thereof engages the actuator-catch 27 on the firing-pin arm 26 and locks the actuator in its retracted position, as shown most clearly in Fig. 29, Sheet 12. These several parts—i. e., bolt, bolt-actuator, and firing-pin—being thus positioned and locked together, may then be drawn back as one member of the gun mechanism to the position illustrated in Fig. 5, Sheet 2, and Fig. 14, Sheet 6, and afterward pushed to the position shown in Fig. 16, Sheet 7, at which time the firing-pin arm 26 engages the rearward end 38 of the sear 39 and releases the actuator-arm 33, allowing the actuator to be thrown forward and downward to effect a closing movement of the bolt relatively to the receiver, and bring said bolt to the position illustrated in Fig. 7, Sheet 4. During the closing movement of the bolt the firing-pin arm is retained in engagement with the sear 39, as will be understood by comparison of said Figs. 6 and 7.

Just previous to the engagement of the firing-pin arm 26 with the rearward end 38 of the sear 39 during the latter stages of the forward and closing movement of the bolt, as hereinbefore described, the guide-face 41 of the actuator comes over the lower actuator-guide 40 of the receiver and the upper side of the lever-arm 42 of the actuator passes under the receiver-arm or upper actuator-guide 43, thereby restraining the actuator from any forward shifting movement until the actuator shall have been unlocked by the releasing of its arm 33 from the engagement with firing-pin-arm catch 27 and the bolt shall have reached its extreme forward position. (Shown in Fig. 6, Sheet 3.) On the bolt reaching the latter position the recoil-abutment 24 of the bolt comes slightly forward of the stop-abutment 22 on the receiver and in position to be brought tightly against said abutment during the closing movement of the bolt or upon the shifting of the bolt from the position shown in Fig. 6, Sheet 3, to the position shown in Fig. 7, Sheet 4.

The forward end of the bolt E has on its upper side a face 108, bearing against the corresponding face 109 of the receiver. On the lifting or transverse movement of the rearward end of the bolt the receiver-face 109 acts as a fulcrum upon which the bolt, as a lever, turns or swings to lift the recoil-abutment 24 of the bolt out of engagement with the stop-abutment 22 of the receiver, as described in the patent hereinbefore referred to. The inauguration of the opening movement of the bolt does not effect the starting of the cartridge-shell out of the firing-chamber of the gun, as in the patent hereinbefore referred to; but, on the contrary, the bolt has a free opening movement independent of the extractor X and does not actuate said extractor to withdraw the cartridge-shell until it has moved a considerable distance backward, as hereinbefore described in connection with the description of the operation of the extracting device.

At the rearward end of the barrel C and in vertical alignment with the bore thereof and in the plane of movement of the cartridge is a cartridge guide or incline 50 for receiving the forward end of the cartridge when this is driven forward by the bolt and for guiding said cartridge upward into the firing-chamber of the gun-barrel.

As a means for locking the bolt-actuator against backward movement when the bolt is in its forward closed position, a back-lock or detent-catch H is provided, which, as in the aforesaid patent, is shown carried by the rearward end of the sear 39, as will be hereinafter described, and is adapted, when the bolt is in the extreme forward closed position, to lie intermediate to and at its forward and rearward ends against the rear face of the depending actuator-arm 33 and the forward face of the rear end of the sear 39, respectively, with the point of contact with the actuator-arm between and in substantial alignment with the point of contact with the sear and the pivotal point of said sear, as will be understood by reference to Fig. 7, Sheet 4, of the drawings. In this position of the parts the back-lock H sustains such a relation to the path of movement of the actuator-arm and the pivotal point of the sear that a retractive force applied to the actuator will simply bind the parts mentioned more securely without effecting a release of the back-lock or changing the relative positions of the sear, back-lock, and actuator. This back-lock H consists of a web or plate 140, having the catch 141 at its forward end adapted for engaging the lower point 112′ of the depending arm 33 of the actuator, and also has a hub 142 at its rear end which projects transversely each side the web 140 and constitutes trunnions. Said back-lock is supported on the sear and has a depending arm 145 at one side of the hub 142, which constitutes the lever by means of which the back-lock may be rocked upon its trunnions to release the forward end thereof from engagement with the actuator-arm 33. As a means for movably securing said back-lock H on the sear, the rearwardly-projecting arm 38 of said sear is vertically and longitudinally slotted, as shown at 38′, (see Figs. 51, Sheet 15,) and has a downwardly and forwardly projecting hook-shaped portion 90′ at the rear end thereof, as shown most clearly in Fig. 49, Sheet 15, which hook-shaped portion forms a semicircular bearing 38″, adapted for receiving and movably supporting a trunnion of the back-lock H. These trunnions will preferably be elongated diametrically to form bearing-faces 143, adapted to bear against the under face of the sear-arm 38 and adapted for limiting the throw of the back-lock. These trunnions of the back-lock are loosely seated in the bearing 38″ of the sear, with the web 140 of said back-lock projecting through the recess 38′ in said sear, said back-lock being held in working position relatively to the sear by means of the sear-spring 94, which has a bearing at the lower end 98 thereof in a notch 97, formed in the inner face of the upper end of the trigger 82, which spring has a bearing at its upper end against the under side of the back-lock, as at 144. This sear-spring, as will be seen, has two functions, one of which is to retain the sear-arm 38 normally in an elevated position and with the trigger in its forward position, and the other of which is to retain the back-lock in opposite engagement with the end of the sear-arm 38 and with its forward end in proper position to engage the actuator-arm 33 when the bolt is in its forward closed position. One of the chief purposes of this back-lock is to prevent accidental retraction of the bolt-actuator while the firing-pin is in its retracted firing position with its depending arm 26 in engagement with the sear, as shown in Fig. 7, Sheet 4, of the drawings, said back-lock forming a deadlock against accidental retraction when the parts are in this position and retaining the bolt-actuator in locked relation with the firing-pin until the back-lock is released from engagement with the actuator-arm 33 either by a depression of the sear-arm through the medium of the trigger or until said back-lock is depressed and released from engagement with the actuator-arm independent of the sear through the medium of the back-lock actuator, which is designated in a general way by K. This back-lock actuator is journaled in the receiver and is adapted for engagement with the depending arm or lever 145 of the back-lock, which lever is actuated thereby to depress the forward end of the back-lock and release this from engagement with the depending arm of the actuator and without affecting the position of the sear, as will be hereinafter described.

The back-lock actuator consists of a short rock-shaft 146, journaled for rocking movement in a bearing 147, formed transversely through the left-hand wall of the receiver slightly in the rear of the lever 145 of the back-lock, said rock-shaft having at the inner end thereof a depending arm 148, having a cam-like projection 148′, adapted for engaging the lower end of and actuating the lever 145 of the back-lock to throw the forward end of said back-lock out of engagement with the depending arm 33 of the actuator, and as a means for rocking the shaft 146 to operate the back-lock the outer end of said shaft is furnished with a lever-arm 149, which extends upwardly and is provided with a thumb-piece at the forward end thereof, and also has a pin or projection 151 upon its inner face near its forward end thereof, which extends into a particircular recess 151′ in the outer face of the wall 4. This back-lock actuator in connection with the back-lock forms an important function in that it enables the back-lock H to be thrown out of engagement with the actuator-arm when the parts are in the positions shown in Fig. 7, Sheet 4, without disturbing the position of the sear relatively to the firing-pin arm, thus enabling the bolt of the gun to be retracted without firing the cartridge contained in the firing-chamber and permitting the removal of said cartridge, as is sometimes desirable.

When it is desired to withdraw a cartridge from the firing-chamber of the gun without firing the same, it is simply necessary to depress the back-lock actuator-arm 149 from the position shown in Fig. 7, Sheet 4, to that shown in Fig. 28, Sheet 12, which carries the depending arm 148 thereof backward against the lower end of the back-lock lever 145. This throws the forward end of the back-lock out of engagement with the actuator-arm 33, as illustrated in said Fig. 28, which leaves the actuator free to be retracted. The retraction of the bolt-actuator is effected in the organization of mechanism herein shown and described by the action of the sear-spring 94, which forces the sear, together with the firing-pin arm and bolt upward to the position shown in Fig. 29, Sheet 12, which, owing to the bearing engagement of the actuator-lever arm 42 with the upper actuator-guide 43 on the receiver, causes the actuator to rock on its journal and throws the lower end of the depending arm thereof into engagement with the catch on the firing-pin arm, thus locking the actuator relatively to the firing-pin and allowing the retraction of the bolt and the withdrawing of the cartridge from the firing-chamber of the gun.

For the purpose of locking the firing-pin in its retracted or cocked position and moving the same out of co-operative relation with the trigger, so as to prevent accidental firing of the gun and at the same time hold the parts in readiness for immediate action, which is a matter of considerable importance in guns of this class, I have provided, in operative relation with the firing-pin and bolt, a firing-pin retracting and locking device, (designated in a general way by L,) which, for convenience, will be termed herein the "firing-pin locker," and which is adapted, when the bolt E is in the forward closed position, (illustrated in Fig. 7, Sheet 4, of the drawings,) for engaging, retracting, and locking the firing-pin out of engagement with the sear-arm 38, as illustrated in Fig. 8, Sheet 4. This firing-pin locker L in the preferred form thereof herein shown consists of a block 220, supported for sliding movement in a vertical slideway 221, formed in the left-hand wall 4 of the receiver B. The inner face of said block is shown substantially flush with the inner face of the receiver-wall and has a cam-like projection 222 in position and adapted for engaging a similar cam-like projection 223 upon the left-hand side of the depending firing-pin arm 26, as illustrated in full and dotted lines in Figs. 7 to 12, inclusive, Sheet 4, of the drawings. The means for operating the firing-pin locker is herein shown as an arm 224, preferably formed integral with the block 220, and extending through a recess 225 in the side wall 4 of the receiver, which arm will preferably be resilient and will bear against the outer face of the receiver and extend normally slightly above the upper edge of the same, and will also have a knurled thumb-piece at the upper end thereof, by means of which the same may be conveniently operated.

When it is desired to lock the firing-pin in its retracted or cocked position and out of engagement with the sear, it is only necessary to lift the firing-pin locker from the position shown in Fig. 7 to that shown in Fig. 8, Sheet 4, which carries the working face of the cam 222 of the locker into engagement with the working face of the cam 223 of the firing-pin arm, which moves the firing-pin arm backward from the position shown in Fig. 7 to that shown in Fig. 8, the working faces of the two cam-like projections 222 and 223 being so disposed that one will ride freely over the other and will prevent accidental release or disengagement with the cam-faces when the parts are in the positions shown in Fig. 8, the cam 223 on the firing-pin arm being shown as having a receding incline at the upper end thereof, which tends to maintain the locker in its elevated position when the firing-pin has been retracted thereby, as will be readily understood by a comparison of said Figs. 7 and 8. When the firing-pin has been locked in the position shown in Fig. 8, it leaves the sear and trigger free to be operated idly, while the sear is retained normally in position to engage the firing-pin arm when released by the depression of the firing-pin locker. Consequently when it is desired to fire the gun and the parts are in the positions shown in Fig. 8, it is simply necessary to depress the arm 224 of the firing-pin locker, which throws the cams 222 and 223 out of engagement and allows the firing-pin arm to engage the sear, as illustrated in Fig. 7, when a movement of the trigger will release said arm and effect the discharge of the gun.

As a means for sustaining, lifting, and controlling the positions of the cartridges in the magazine end of the gun, I have provided in connection with said magazine a cartridge-controlling elevator, (designated in a general way by G,) which in the preferred form thereof herein shown consists of the lifting lever or arm 230, journaled at its forward end in a bearing 231 in the front face of the vertical block 59' of the receiver, a lifting-arm actuating-spring 232, a follower 184, pivotally carried at the forward end of the lifting-lever 230 and adapted for supporting and controlling the positions of the cartridges at successive points in the cartridge-elevating movement of the lifting-arm, and a pair of cams 233 and 233', carried by the side walls of the magazine in position and adapted to co-operate with the follower for retaining said follower in certain positions during the elevating movement thereof. As shown most clearly in Figs. 49, 50, 51, and 52, Sheet 15, the lifting-arm or elevator 230, which constitutes the cartridge-elevator proper, is vertically and longitudinally recessed, as shown at 234, to facilitate the movement of the forward end of the follower, and the side plates of said elevator embrace the side faces of the vertical block 59', a pivot-pin 235 being extended through the forward ends of said lifting-arm 230 and being adapted to support the elevator-actuating spring 232, which is preferably a helical spring wound upon said pin 235. This spring is shown fixed at one end thereof to said pin between the adjacent faces of the two side plates of the elevator and is secured at the opposite end thereof to the inner face of the bearing 231 of the block 59'. This spring not only constitutes an actuator for the cartridge-elevator arm 230, but also constitutes a journal of the cartridge-lifting arm.

As a means for assembling and disassembling of the cartridge-elevator mechanism, the journal-bearing 231 for the lifting-arm 230 is open at its forward side, it being substantially semicircular in shape, and the journal for the lifting-arm 230 is held in place in said journal-bearing by the removable tip-screw 60, which bears against the forward side of the journal.

As a means for controlling the position of the follower 184, said follower has at the rear end thereof a head or pivot-plate 236, which is pivoted to the rearward end of the lifting-arm 230 and has preferably two downwardly and rearwardly projecting arms 237 and 237', one arm at each side the cartridge-lifting arm 230 in position and adapted for engaging the cam-faces of the cams 233 and 233', respectively, which cams co-operate with the arms of the follower to hold the follower during its ascending movement in the requisite positions for presenting the upper cartridge to the firing-chamber of the gun in the proper manner.

The operation of the cartridge-elevating mechanism will be readily understood by reference to Fig. 49, Sheet 15, of the drawings, which shows the follower in full and dotted lines in a series of positions occupied thereby during the cartridge-lifting movement of the lifting-arm 230, and it will be further noticed that the working faces of the cams 233 and 233' are so disposed as to be in constant bearing contact with the rearward end of the follower-arms 237 and 237'.

As before stated, it is preferable to use in connection with the gun herein shown and described a cartridge-packet such as shown, described, and claimed in my application, Serial No. 533,962, filed June 25, 1895. This cartridge-packet, which is designated in a general way by P, and which is most clearly shown in Figs. 2, 3, and 4, Sheet 1, of the drawings, consists of a clip-body 250, having a longitudinal cartridge-head-receiving channel 251, a series of cartridges c, supported one upon and by the other and having the heads thereof located within said cartridge-head-receiving channel, a cartridge-locker 252, supported for rocking movement on the clip-body and having laterally-disposed locking-faces 253 in engagement with heads of the terminal cartridges and holding said cartridges securely in place, and also having a locker-actuating lever 254, extending through a transverse recess in the clip-body and adapted to be moved transversely of the clip-body to swing the locking-faces of the cartridge-locker transversely of the cartridge-head-receiving channel and out of engagement with the heads of the cartridges to detach the locker and clip-body from said cartridges.

While it is preferable to use the cartridge-packet just described in connection with my improved gun, it will of course be obvious that other forms of cartridge-packets may be practically used in connection with said gun. The cartridge-packet herein described does not properly constitute a part of my present invention, it being made the subject-matter of the application, Serial No. 533,962, hereinbefore referred to, and therefore will not be claimed herein. As a means for automatically releasing the cartridges from the clip as said packet is inserted into the magazine of the gun and as a means for holding the clip after the same is inserted into the magazine of the gun against vertical movement relatively to the magazine, I have provided in connection with the magazine a cartridge-clip-releasing device, which is designated in a general way by R, which is located in position and is adapted for engaging the cartridge-locker of the clip and for disengaging said locker and clip from the cartridges carried thereby, and a clip-abutment (designated by R') in position and adapted for engaging and holding the clip against vertical movement when the clip is in its lowest position in the magazine of the gun.

In the preferred form thereof herein shown the cartridge-clip-releasing device R consists of two vertically-disposed and transversely-remote wedges 255 and 256, respectively, located one at each side of the magazine M of the gun in the path of movement of the cartridge-packet P and in position and adapted one of them for engaging the actuating-lever 254 of the cartridge-locker 252 when the cartridge-packet is inserted one side up and the other for engaging the actuating-lever when the cartridge-packet is inserted in the magazine the other side up, whereby said locker is partially rotated to throw its locking-faces transversely of and out of engagement with the terminal cartridges of the series of cartridges of the packet, as will be readily understood by a comparison of Figs. 58, 59, and 60, Sheet 15, of the drawings, which illustrate the operation of actuating the locker during the insertion of the packet in the magazine of the gun, said figure showing a portion of the side walls of the magazine, the two cartridge-locker-actuating wedges, and a portion of a cartridge-packet in successive positions of said packet relatively to the wedges. After the cartridge-locker 252 is disengaged from the cartridges, at which time the cartridges are supported in proper positions upon the follower, the cartridge-locker and clip-body 250 being released from the cartridge are free to drop out of the magazine, as shown in dotted lines, Fig. 5, Sheet 2, of the drawings, which figure shows in dotted and full lines the manner in which a cartridge-packet is inserted into the magazine of the gun.

The clip-abutment R' is shown (see Fig. 5, Sheet 2, and Figs. 50, 51, and 53, Sheet 15) in the nature of a block or projection formed upon the forward face of the guard-block 59, substantially midway between the side walls of the magazine M of the gun, the lower bearing-face thereof being in position and adapted for extending over and engaging the locker-actuating lever 254 of the packet when said lever is in the open position illustrated in Figs. 5 and 60 to prevent accidental lifting movement of the clip-body and locker, as will be readily understood by a comparison of the figures referred to in this paragraph.

By the provision of the cartridge-clip-releasing device R and the cartridge-clip abutment, substantially as described, the operation of filling the magazine of the gun with cartridges is greatly facilitated, as it is simply necessary to insert the cartridge-packet as one piece into the magazine through the upper end thereof, as illustrated in dotted lines in Fig. 5, Sheet 2, and press said packet downwardly into the magazine until the lower cartridge of the packet rests upon the follower 184 and the actuating-lever 254 of the cartridge-locker rests below the abutment R'. During the descent of the packet P in the magazine to the position illustrated in Fig. 5, the cartridge-locker lever 254 is engaged by one or the other of the actuating-wedges 255 or 256, which wedge gradually throws said lever outwardly from the position shown in Fig. 58 to that shown in Fig. 60, Sheet 15, and beneath and in position to be engaged by the abutment R'. When the cartridge-packet is in the position illustrated in Fig. 5, with the cartridge-locker released from the cartridges, as shown in said figure, the first movement of the cartridge-elevator will tend to jar the cartridge-locker and clip-body out of the magazine of the gun, leaving the cartridges alone supported in the magazine upon the follower of the cartridge-elevator.

Having thus described my invention, I claim—

1. In a gun of the class specified, the combination with the gun-barrel having an axial bore; of a receiver having a stop-abutment intersecting the plane of the axis of the bore of the barrel; and a sliding bolt supported for longitudinal and transverse movements relatively to the bore of the barrel, and having a recoil-abutment in position and adapted for engaging and coacting with the stop-abutment on the receiver for holding said bolt against recoil, substantially as described.

2. In a gun of the class specified, the combination with the gun-barrel having an axial bore; of a sliding bolt supported for transverse movement relatively to the bore of the barrel, and having a recoil-abutment whose bearing-face is concentric to the axis of transverse movement of the bolt; a receiver having a stop-abutment whose bearing-face is concentric to the axis of transverse movement of the bolt, and intersects the plane of the axis of the bore of the barrel, and is in position and adapted for coacting with the recoil-abutment of the bolt for holding said bolt against recoil; and means for actuating said bolt, substantially as described.

3. In a gun of the class specified, the combination with the gun-barrel having an axial bore; of a receiver having a stop-abutment intersecting the plane of the axis of the bore of the barrel; a bolt supported for longitudinal and transverse movements relatively to the receiver, and having a recoil-abutment engaging the stop-abutment of the receiver when the bolt is in its forward closed position; a firing-pin supported for longitudinal movement within the sliding bolt, and having its longitudinal axis at an inclination to, and intersecting the longitudinal axis of, the bore of the barrel, when the bolt is in its forward, closed position; means for actuating said bolt; and means for operating the firing-pin, substantially as described.

4. In a gun of the class specified, the combination with the receiver and the sliding bolt; and with the firing-pin carried by, and movable longitudinally of, said bolt; of a firing-pin-retracting locker having means in position and adapted for engaging the firing-pin when the same is in its cocked position, for retracting said firing-pin beyond its cocked position, and for locking said firing-pin in this retracted position, substantially as described.

5. In a gun of the class specified, the combination with the receiver, the sliding bolt, the firing-pin and the trigger mechanisms; of a firing-pin-retracting locker adjustably supported on the receiver, and having means for engaging and moving the firing-pin out of operative relation with the trigger mechanism when the bolt is closed and the firing-pin is in its cocked or retracted position, substantially as described, and for the purpose set forth.

6. In a gun of the class specified, in combination with a receiver; a bolt supported for longitudinal and transverse movement on the receiver; a firing-pin carried by and movable longitudinally of said bolt, and having an arm at the rearward end thereof extending normally below the upper face of the receiver; and a firing-pin locker supported for vertical movement in a guideway on the receiver, and having a projection adapted for engaging the depending-arm of the firing-pin, whereby said firing-pin may be retracted and locked out of engagement with the trigger mechanism of the gun, substantially as described.

7. In a gun of the class specified, the combination with the receiver and the sliding bolt; of a firing-pin carried by, and movable longitudinally of, said sliding bolt, and having a depending-arm with a laterally-disposed cam-like projection thereon; and a firing-pin-retracting locker movably supported on the receiver, and having a cam-like projection in position and adapted for engaging the cam-like projection on the firing-pin arm, when the bolt is closed relatively to the receiver, whereby the firing-pin may be retracted and locked in its cocked or retracted position, and out of engagement with the trigger mechanism of the gun, substantially as described, and for the purpose set forth.

8. In a gun of the class specified, the combination with the receiver adapted for carrying the sliding bolt; of a sliding bolt supported for longitudinal and transverse movement on said receiver; a bolt-stop shiftable with, and movable relatively to, said bolt; and a stop-abutment supported on the receiver for movement transversely of the path of movement of the bolt stop, substantially as described.

9. In a bolt-gun having a receiver adapted for receiving a sliding bolt and having a bolt supported for longitudinal and transverse movements in said receiver; the combination therewith, of a stop carried by, and movable with relation to, said bolt; a stop-abutment supported for vertical movement on a receiver, and adapted to be projected into the path of movement of the stop carried by the bolt; and means for moving said stop-abutment into and out from the path of movement of said stop, substantially as described.

10. In a bolt-gun, the combination with the receiver, and with the bolt supported for longitudinal and transverse movements in the receiver of a cartridge-shell extracting and ejecting device embodying an extracting-member and an ejecting-member, carried, one by the other and supported for movement with, and longitudinally of, the bolt at one side of said bolt; a stop-abutment carried by the receiver normally in the path of longitudinal movement of the extracting and ejecting device, and adapted for limiting the longitudinal movement thereof; and means for actuating the bolt and the extracting and ejecting device, substantially as described.

11. In a bolt-gun, the combination with the receiver having a bolt supported for longitudinal and transverse movements therein; of a cartridge-shell extracting and ejecting device comprising two shiftably-connected members supported at one side of the bolt for movement with, and longitudinally of, said bolt; a stop-abutment carried by the receiver normally in the path of longitudinal movement of the extracting and ejecting device, and having a cam-face adapted for engaging and effecting a transverse ejecting movement of said device relatively to the bolt; and means for actuating the bolt and the extracting and ejecting device, substantially as described, and for the purpose set forth.

12. In a bolt gun of the class specified, having a receiver and a sliding bolt, substantially as described; the combination therewith of a cartridge-shell extracting and ejecting device comprising two shiftably-connected members supported at one side of the sliding bolt for movement with, and longitudinally of, said bolt; means for effecting a longitudinal movement of the sliding bolt and extractor; and means, substantially as described, for limiting the longitudinal movement of the bolt and the extractor, and for effecting a transverse ejecting movement of said extractor, substantially at the end of the retractive movement of said extractor, substantially as described, and for the purpose set forth.

13. In a gun of the class specified, the combination with the receiver adapted for carrying a sliding bolt; of a sliding bolt; and a cartridge-shell extracting and ejecting device comprising an extracting-member and an ejecting-member pivotally connected together, and both supported for a limited amount of movement longitudinally of the bolt and receiver, substantially as described.

14. In a gun of the class specified, the combination with the receiver adapted for carrying a sliding bolt; and with a sliding bolt supported for longitudinal and transverse movements in said receiver; of a cartridge-shell-extracting member and a cartridge-shell-ejecting member, carried, one by the other, and supported in the receiver for movement with, and longitudinally of, the bolt; and means for actuating the bolt in advance of the two connected members, substantially as described.

15. In a gun of the class specified, the combination with the receiver; of a bolt supported for longitudinal and transverse movements in the receiver; a cartridge-shell extracting and ejecting device supported for sliding movement between the side wall of the receiver and the bolt, and comprising two pivotally-connected members; means carried by the bolt in position and adapted for actuating the extracting and ejecting device at predetermined points in advancing and retracting movements of said bolt; and means for actuating the bolt to effect a limited amount of longitudinal movement thereof independent of the extracting and ejecting device, substantially as described, and for the purpose set forth.

16. In a gun of the class specified, the combination with the receiver; of a bolt supported for longitudinal and transverse movements in the receiver; a cartridge-shell extractor supported for sliding movement, relatively to the receiver, at one side of the bolt and in operative connection with said bolt; means carried by the bolt in position and adapted for actuating the extractor at predetermined points in the advancing and retractive movements of said bolt; means in position and adapted for holding the extractor against longitudinal movement during the first stage of the advancing movement of the bolt; and means for actuating said bolt; substantially as described, and for the purpose set forth.

17. In a gun of the class specified, the combination with the receiver, and with a sliding bolt supported for longitudinal and transverse movements in the receiver; of a combined cartridge-shell extractor and ejector movably supported in the receiver for movement longitudinally of, and with, the bolt, and comprising a substantially-rigid extracting-member and a resilient ejecting-member, carried, one by the other for movement together, and relatively to each other; and means for actuating the bolt to effect an extracting and ejecting movement of the combined extractor and ejector, substantially as described.

18. In a gun of the class specified, the combination with a receiver adapted for carrying a sliding bolt; of a bolt supported for longitudinal and transverse movements in the receiver; a combined cartridge-shell extractor and ejector, comprising an extracting and an ejecting member in pivotal connection with each other, and adapted for movement with the bolt, and longitudinally of the bolt and receiver; and means for advancing and retracting the bolt and combined extractor and ejector, one in advance of the other, and for imparting movement thereto of relatively-different lengths, substantially as described, and for the purpose set forth.

19. In a gun of the class specified, the combination with the receiver adapted for carrying a sliding bolt; of a bolt supported for sliding movement in said receiver, and having relatively-long backward and forward movements; a cartridge-shell extractor supported at one side of said bolt, for a limited amount of movement longitudinally of the bolt and the receiver; an ejecting-spring shiftably carried on said extractor for movement with said extractor; means carried by the bolt for effecting relatively-short backward and forward movements relatively to the movements of the bolt; and means for actuating the bolt, substantially as described.

20. In a gun of the class specified, the combination with the receiver adapted for carrying a sliding bolt; and with a sliding bolt supported for longitudinal and transverse movements in said receiver; of a combined extractor and ejector supported for longitudinal and transverse movements between the bolt and the receiver, and embodying a substantially-rigid extracting-member having a hook at one end thereof for engaging the cartridge-head; and a resilient ejecting-member pivotally carried on the extracting-member; means carried by the bolt for controlling the longitudinal movements of the combined extractor and ejector relatively to the bolt; means carried by the receiver in position and adapted for engaging the extractor and ejector to limit the retractive movement of the bolt, and to effect an abrupt, transverse ejecting movement of the extracting-member; and means for actuating the bolt, substantially as described, and for the purpose set forth.

21. In a gun of the class specified, the combination with the receiver, and with the sliding bolt supported for transverse movement in the receiver; of a cartridge-shell extractor supported for longitudinal movement at one side of the bolt; co-operative cams carried by the bolt and the extractor, respectively, and adapted for effecting a retractive movement of the extractor relatively to the bolt upon the closing movement of said bolt; and means for effecting a closing movement of the bolt, substantially as described, and for the purpose set forth.

22. In a gun of the class specified, the combination with the receiver adapted for carrying a sliding bolt; of a sliding bolt and a cartridge-shell extractor supported in co-operative relation in said receiver, and adapted to have longitudinal movements of relatively-varying lengths; means for limiting the retractive movement of the bolt and extractor, synchronously; means for holding the extractor against movement during the first stage of the advancing movement of the bolt; and means for effecting a synchronous movement of the bolt and extractor during the later stages of the advancing movement thereof, substantially as described, and for the purpose set forth.

23. In a gun of the class specified, having a receiver adapted for carrying a sliding bolt; a sliding bolt carried for transverse movement of said receiver, and having at one side thereof an extractor-actuating cam; in combination with an extractor carried for longitudinal movement at one side of said bolt, and having a cam at one side thereof in position and adapted to be engaged by the cam upon the sliding bolt, during the transverse closing movement of said bolt, whereby, the extractor will be slightly retracted on the closing movement of the bolt, substantially as described.

24. In a gun of the class specified, the combination with the receiver and with the sliding bolt; of an extractor supported at one side of said bolt for longitudinal and transverse movement relatively to the bolt; an ejecting-spring carried by the extractor with one portion thereof in sliding engagement with the receiver, and normally pressing the outer end of said extractor inwardly to a point intersecting the axis of the bolt; and means for actuating the extractor, substantially as described.

25. In a gun of the class specified, the combination with the receiver and with the bolt having a longitudinal working stroke, and a transverse closing stroke relatively to the receiver; of a cartridge-shell extractor supported for longitudinal movement relatively to the bolt; and means carried by the bolt and the extractor in position and adapted for first throwing the forward end of the extractor inward to lock the same into engagement with the head of the cartridge, and secondly, retracting the extractor relatively to the bolt to draw the head of the cartridge tightly against the head of the bolt, substantially as described.

26. In a gun of the class specified, the combination with the receiver; of a sliding bolt and a cartridge-shell extractor in co-operative relation, and having relatively differential movements; cams carried by the bolt and extractor, and controlled in their effective movements by the transverse movement of the bolt, and adapted for synchronously moving the bolt and extractor longitudinally in opposite directions; and means for effecting a transverse movement of the bolt, substantially as described.

27. In a gun of the class specified, a longitudinally and transversely movable bolt having an extractor-actuating cam at one side thereof; in combination with a transversely and longitudinally movable extractor having a cam adapted for co-operating with the cam on the bolt to effect a retractive movement of the extractor relatively to the bolt, upon a transverse closing movement of the bolt; and means for bringing the two cams into co-operative relation at a predetermined point in the advancing movement of said bolt, substantially as described.

28. In a gun of the class specified, the combination with the receiver having a longitudinal guiding-groove in the inner face of one of the side walls thereof; of a bolt supported for longitudinal movement in the receiver having a stop-face in advance of a stop-face on the extractor; an extractor carried for longitudinal and transverse movement relatively to, and by, the bolt; an ejecting-spring carried by the extractor, and having a sliding movement in the groove of the receiver, whereby said extractor and spring constitute a guide-stop for the bolt; and a stop-abutment supported on the receiver, and adapted to be projected into the path of movement of the extractor and spring, to limit the retractive movement of said bolt, substantially as described.

29. In a gun of the class specified, the combination with the receiver adapted for receiving a sliding bolt, and having a vertical cartridge-magazine; of a bolt supported for sliding movement in said receiver; a cartridge-shell extractor in operative connection with, and adapted for differential movement relatively to the bolt; an extractor-actuating spring shiftably carried by the extractor and having a sliding movement in the receiver, and acting to project the forward end of the extractor across the longitudinal axis of the magazine when the bolt is in its retractive position; means carried by the receiver in position and adapted for engaging and effecting an ejecting movement of the extractor at the end of the retractive movement of the bolt, and also for limiting said retractive movement; and means for actuating said bolt, substantially as described.

30. In a gun of the class specified, the combination with the bolt supported for longitudinal and transverse movements; of a cartridge-shell extractor supported for longitudinal and transverse movements relatively to, and at one side of, the bolt, and having a laterally-disposed head at the rearward end thereof; remotely-disposed extractor-head-engaging abutments located at one side of the bolt in position and adapted for alternately engaging the head of the extractor, and for moving said extractor backward and forward; an ejecting-spring movably carried by the ejector, and adapted for movement longitudinally of the member; and means for actuating said bolt, substantially as described.

31. In a gun of the class specified, the combination with the receiver; of an extractor supported for longitudinal movement in the receiver; and having a longitudinal depression at the side thereof adjacent to the receiver; an ejecting-spring pivotally carried by said extractor with its forward end normally resting in the depression, and having the rearward end thereof in position and adapted to be actuated by a fixture on the sliding bolt; a sliding bolt carried in the receiver, and adapted for longitudinal and transverse movement relatively to said receiver; and having a fixture in position and adapted for engaging the rearward end of the ejecting-spring on the transverse closing movement of the bolt to throw the forward end of the spring upward out of the depression of, and force the said forward end inward into locked engagement with, the head of a cartridge, substantially as described.

32. In a gun of the class specified, the combination with the receiver and with the bolt supported for longitudinal and transverse movements in the receiver; of a combined extractor and ejector comprising two shiftably-connected members, both of which are supported for longitudinal movement relatively to the bolt and the receiver, and one member of which is supported for movement laterally of the other member; means carried by the bolt for controlling the movements of the shiftably-connected members; and means for actuating said bolt, substantially as described.

33. The combination with the sliding bolt in a gun of the class specified; of a cartridge-shell extractor in operative connection with said bolt, and adapted for differential movement relatively to said bolt; an ejecting-spring pivotally supported intermediate of its ends on one side of the extractor, and adapted for movement relatively to said extractor; means carried by the bolt in position and adapted for engaging and rocking said ejecting-spring on its axis relatively to the extractor, substantially as described, and for the purpose set forth.

34. In a gun of the class specified, the combination with the receiver; of a bolt supported for longitudinal and transverse movements in the receiver, and having a laterally-projecting stop at the forward end thereof; a cartridge-shell extractor supported for sliding movement in the receiver, and having a head adapted for engaging a stop on the sliding bolt; an ejecting-spring pivotally carried on the extractor, and adapted for movement laterally thereof; means carried by the bolt for moving the ejecting-spring laterally of the bolt upon the closing movement of said bolt; an extractor-actuating stop-abutment movably carried on the receiver, and normally projecting into the path of, and adapted for imparting a transverse ejecting movement to, the extractor, and for limiting the retractive movements of the extractor and bolt; and means for actuating the bolt, substantially as described, and for the purpose set forth.

35. In a gun of the class specified, the combination with a receiver and its cartridge-magazine; of a spring-actuated cartridge-lifter supported for movement in the magazine, and having a pivotally-supported cartridge-supporting follower; and a cam-guide on the magazine, which engages and controls the position of the follower during the movements of the lifter, substantially as described.

36. In a gun of the class specified, having a cartridge-receiving magazine; of an oscillatory cartridge-lifter pivotally supported at its forward end near the forward end of the magazine; a spring for normally elevating the rearward end of the cartridge-lifter in the magazine; a cam-guide on the magazine, which engages and controls the position of the cartridge-lifter; and a stop for limiting the throw of said cartridge-lifter, substantially as described.

37. In a gun of the class specified, having a fixed cartridge-magazine; of cartridge elevating and positioning apparatus consisting of an oscillatory lifting-arm pivotally supported at the forward end of the magazine, and having its free end projected into the magazine; a helical-spring wound upon the pivot of the cartridge-lifting arm and fixedly connected at its outer end with the magazine; a follower pivotally supported at the free end of the cartridge-lifting arm, and having a depending-arm in position for engaging a follower controlling-cam; and a follower controlling-cam constituting a fixture of the magazine, and having its working-face projecting into the path of movement of the depending-arm of the follower, and adapted for controlling the position of said follower, substantially as described.

38. In a gun of the class specified, the combination with the receiver and its fixed cartridge-magazine; of a longitudinally-recessed cartridge-lifting arm pivotally carried at one end on a part of the gun-magazine, and having its opposite end projected into the cartridge-receiving opening of said magazine; a cartridge-supporting follower pivotally supported at the free end of the cartridge-lifting arm and adapted for movement between the side walls of said arm; means for automatically elevating said cartridge-lifting arm and follower; and means carried by the walls of the magazine for engaging and controlling the horizontal position of the cartridge-supporting follower, substantially as described.

39. In a gun of the class specified, the combination with the receiver adapted for receiving a cartridge-packet having an operative cartridge-locker for holding and releasing the cartridges of the packet; of a locker-actuator located within said magazine in position for actuating the locker of the packet to release the cartridges when the packet is inserted into the magazine, substantially as described.

40. In a gun of the class specified, the combination with the receiver and its cartridge-magazine; of a cartridge-locker-actuating wedge located within said magazine, and in position and adapted for automatically operating the locker of a cartridge-packet to release the cartridges as said packet is inserted into the magazine; and a fixed abutment located in the magazine in position and adapted for engaging a part of said cartridge-packet for holding said parts against lifting movement in the magazine, substantially as described.

41. In a gun of the class specified, the combination with the fixed magazine thereof; of a pair of locker-actuating wedges located, one at each side of the longitudinal axis of the magazine, and in position for actuating the locker of a cartridge-packet, substantially as described.

42. In a gun of the class specified, the combination with the gun-magazine; of a pair of vertically-disposed cartridge-locker-actuating wedges fixedly located, one at each side of the longitudinal axis of, and within, the magazine, and in position for actuating the locker of a cartridge-packet; and a fixed abutment located in the magazine between the upper ends of said wedges, and in position for engaging a part of the cartridge-packet for holding said part against lifting movement relatively to said wedges, substantially as described.

43. The combination with the receiver, and with the bolt supported for sliding movement in said receiver and provided with a stop-abutment; of a stop-abutment shiftably carried by the receiver, and adapted to be projected into the path of movement of said stop carried by said bolt, and having a resilient arm provided with a catch which engages in notches in the receiver for holding said stop-abutment in its adjusted position, and notches in the receiver, substantially as described.

44. In a gun of the class specified, the combination with the receiver having a transverse guideway in one of the side walls thereof, and with the bolt supported for sliding movement in said receiver; of an abutment-block supported in said guideway for movement into and out from the path of movement of a stop carried on the bolt; and an actuating-arm carried on the abutment-block in shiftable yielding engagement with the receiver, substantially as described, and for the purpose set forth.

45. In a gun of the class specified, the combination with the receiver and the sliding bolt; of a firing-pin supported for longitudinal movement in said bolt, and having a cam-like projection; a cam shiftably carried on the receiver, and coacting with cam on the firing-pin to retract said firing-pin when in its cocked position; and means for actuating said cam, substantially as described.

46. In a gun of the class specified, the combination with the receiver the sliding bolt and the firing-pin; of trigger mechanism embodying a sear for normally engaging and holding the firing-pin in its cocked position; and a retracting and locking device carried by the receiver, and operable for retracting the firing-pin when in its cocked position, and locking it out of engagement with the sear, substantially as described.

47. In a gun of the class specified, the combination with the receiver, the sliding bolt, the firing-pin, and the trigger mechanism; of a back-lock for normally holding the firing-pin and trigger mechanism in positive engagement; means for throwing the back-lock out of action; and means for automatically elevating the rearward end of the bolt concurrently with the throwing out of action of the back-lock, substantially as described.

48. In a gun of the class specified, the combination with the receiver, and the cartridge-magazine having a transverse journal-bearing at the forward end thereof; of a cartridge-lifter having a transverse journal concentric to the journal-bearing of the magazine; a helical-spring secured at one end to the journal of the cartridge-lifter, and supported between said journal and the journal-bearing of the magazine, and secured at its outer end to said magazine, whereby said spring constitutes a resilient cartridge-lifter-actuating journal, substantially as described.

49. The combination with the gun-magazine; of the longitudinally-slotted cartridge-lifter arm pivotally supported at the forward end of the magazine, and having its rearward end extended into said magazine; a follower pivotally supported at its rearward end to the rearward end of the lifting-arm, and having its forward end of less width than the longitudinal slot in the lifting-arm, and adapted for movement between the side walls of said lifting-arm; and a cam-guide upon the magazine for engaging and controlling the position of the follower during the movements of the lifting-arm, substantially as described, and for the purpose set forth.

50. The herein-described cartridge-elevator, it consisting of the longitudinally-slotted cartridge-lifting arm admitting the passage of the cartridges therethrough; a suitable actuating-spring; and a cartridge-supporting follower pivotally carried at the rearward end of said arm, and adapted for movement between the side walls of said arm, substantially as described.

51. The herein-described cartridge-extractor having a laterally-projecting cartridge-head-engaging hook at the forward end thereof, and having a groove in the rearward end thereof adapted for receiving a catch upon an ejecting-spring, substantially as described.

52. The herein-described ejecting-spring having a pivot-pin intermediate of its ends, and having a catch at the rearward end thereof adapted for entering a notch in the rearward end of an extractor, substantially as described.

53. The herein-described combined extractor and ejector, it consisting of the substantially-rigid extracting-member having a longitudinally-disposed offset at the forward end at one side thereof, and having a pivot-hole in the same side thereof intermediate of the ends of said member, and also having a vertically-disposed groove in the rear end of said member; and a resilient ejecting-member having a pivot seated in the pivot-hole of the extracting-member, and having a laterally-disposed catch at the rearward end thereof shiftably seated in the groove in the rear end of the extracting-member, and having its free, forward end normally in position for engaging the offset on the side face of the extracting-member upon a lateral movement of the ejecting-member relatively to the extracting-member to throw said extracting-member transversely, substantially as described, and for the purpose set forth.

54. In a gun of the class specified, the combination with the receiver; of a bolt supported for sliding movement in the receiver, and having an extractor-actuating projection and an ejector-actuating projection at one side thereof; an extracting-member and an ejecting-member pivotally connected together, and supported for longitudinal movement between the sliding bolt and the receiver, and the extracting-member having a projection on its inner face in position to coact with the extractor-actuating projection on the bolt, and the ejecting-member having a longitudinal projection in position to be engaged by the ejector-actuating projection on the bolt during the first part of the transverse closing movement of the bolt, substantially as described, and for the purpose set forth.

55. The herein-described cartridge-extractor having a laterally-projecting cam on the side face thereof, a bolt having longitudinal and transverse movement, and an oppositely-disposed cam on the side face of the bolt, adapted to coact with the cam on the said extractor in the final closing movement of the bolt, whereby the extractor is retracted and caused to hold the cartridge against the bolt, substantially as described.

JAMES P. LEE.

Witnesses:
FRED. J. DOLE,
R. W. PITTMAN.